(12) United States Patent
Munteanu

(10) Patent No.: US 10,717,611 B2
(45) Date of Patent: Jul. 21, 2020

(54) PICK AND PLACE MACHINE

(71) Applicant: Dan Munteanu, Fairfield, CT (US)

(72) Inventor: Dan Munteanu, Fairfield, CT (US)

( * ) Notice: Subject to any disclaimer, the term of this patent is extended or adjusted under 35 U.S.C. 154(b) by 0 days.

(21) Appl. No.: 16/139,665

(22) Filed: Sep. 24, 2018

(65) Prior Publication Data

US 2020/0095070 A1 Mar. 26, 2020

(51) Int. Cl.
*B65G 47/90* (2006.01)
*B65G 47/91* (2006.01)
*B23P 19/00* (2006.01)

(52) U.S. Cl.
CPC ......... *B65G 47/902* (2013.01); *B65G 47/914* (2013.01); *B23P 19/007* (2013.01)

(58) Field of Classification Search
CPC ........................... B65G 47/902; B65G 47/914
USPC ................ 74/89.12; 414/749.1–749.5, 751.1
See application file for complete search history.

(56) References Cited

U.S. PATENT DOCUMENTS 7,047,785 B2 * 5/2006 Peruzzo ................. B21D 11/12
414/751.1

* cited by examiner

*Primary Examiner* — Ronald P Jarrett
(74) *Attorney, Agent, or Firm* — The University of Arizona IP Clinic

(57) ABSTRACT

Disclosed is a pick and place device comprising of a novel mechanism that can be used to pick up and move a payload from one location to another location and descend and release such payload before repeating the cycle. This same device can act as a rotary/linear linkage to provide the horizontal motion of the device and also become a straight-line generator to provide vertical motion and alternate between the two thus generating a rectangular type motion. This novel mechanism provides balanced force distribution through the system as well as appropriate acceleration control of the payload and moving mechanism components during the work cycle to ensure a smooth and efficient overall performance.

8 Claims, 19 Drawing Sheets

PICK AND PLACE MACHINE

BACKGROUND

Manufacturing companies are requiring faster, more efficient and reliable ways to manufacture their products. This can be done by manual labor, such as on assembly lines, or through surface mount technology or component placement systems, such as various pick-and-place machines. The latter provide higher speed and higher levels of precision compared to other types of assembly processes. The purpose of these machines is to pick up parts, packages or components and place them in a new location with consistency and efficiency at increasing production rates.

Pick-and-place machines vary and can be cam driven, pneumatic, electromechanical, or robotic and can vary in size and capability, such as lifting capacity, mounting options and reach.

Some of the disadvantages of existing pick-and-place machines include the high level of noise and low cyclic rates of pneumatic machines, high initial costs of robotic machines, the need for excess space within the plant or structure, and the need for highly skilled programmers to run the equipment.

Embodiments of the present pick and place device solve the problems associated with the disadvantages of prior pick-and-place machines through their flexibility, longer stroke lengths and various cycle speeds, lack of clearance issues, and smoother motion.

Embodiments of the present invention satisfy the need for more efficient movement of items in processes such as manufacturing in that it has a higher degree of flexibility in adjusting and modifying pick-up and place points. It has longer vertical and horizontal stroke lengths. It offers varying strokes per minute. It performs using only one servomotor and gear head which allows for a lower cost for producing this system in various configurations.

Embodiments of the present invention are capable of varying cycle rates of 5 ppm to more than 60 ppm and can move parts in wide ranges of size and weight with accurate placement. Embodiments of the present invention offer smoother motion, acceleration and deceleration by use of a linkage mechanism and is capable of extra control through the servo-motor. An additional advantage of embodiments disclosed here is the capability of providing a long vertical stroke when necessary for a part to be removed from one station and moved to another when each station is separated by an obstacle all while functioning at a wide range of rates. All moving mechanisms of the embodiments of the present invention are situated above the work area and thus provide a large amount of space to maneuver in all directions without having clearance issues.

The present disclosure identifies a more efficient pick-and-place device combining efficiencies in cost, structural performance and value than has ever existed before.

SUMMARY

Embodiments of the present invention provide a pick and place device that is capable of picking up and placing objects from one location to another in a more efficient and improved manner than has been achievable before. My preferred embodiment is a device including a horizontal guide rail supported by two vertical rails or other supportive means where the horizontal guide rail, in conjunction with various linkages, guides the horizontal and vertical motion of a vertical rod attached to a grabber tool. In operation, the grabber tool grabs and holds an object to be moved at an initial location, moves vertically ascending to clear any object locating features, surrounding objects or obstacles, moves horizontally to a location above the position where the object being moved is to be placed, descends to the placement location, and there releases the object being moved. In this manner, the grabber tool generally moves in an inverted "U" pattern. After release of the object being moved, the grabber tool reverses the described motion to return to the initial location and pick up another object to be moved and placed at the final location. The grabber tool can be any of the existing grabber tools able to pick up and release an object, such grabber tools are typically operated by an electric or pneumatic motor and can control jaws, arms or other forms of grabbing components by having a closed (grabbing) and an open (releasing) position. The grabber tool can also be a suction cup supplied with vacuum suction from a source that switches on and off making the cup capable of grabbing and releasing.

The horizontal and vertical motions and positioning of the vertical rod and attached grabber tool in the preferred embodiment of my invention are controlled by linkages attached to the vertical rod, sliders configured to slide along the horizontal and vertical guide rails, and a motor causing rotation of the attached linkages all configured as explained in detail below.

BRIEF DESCRIPTION OF THE DRAWINGS

My invention will be better understood from a reading of the following description taken in conjunction with the drawings in which like reference designators are used to designate like elements, and in which.

DESCRIPTION

Figure 1:
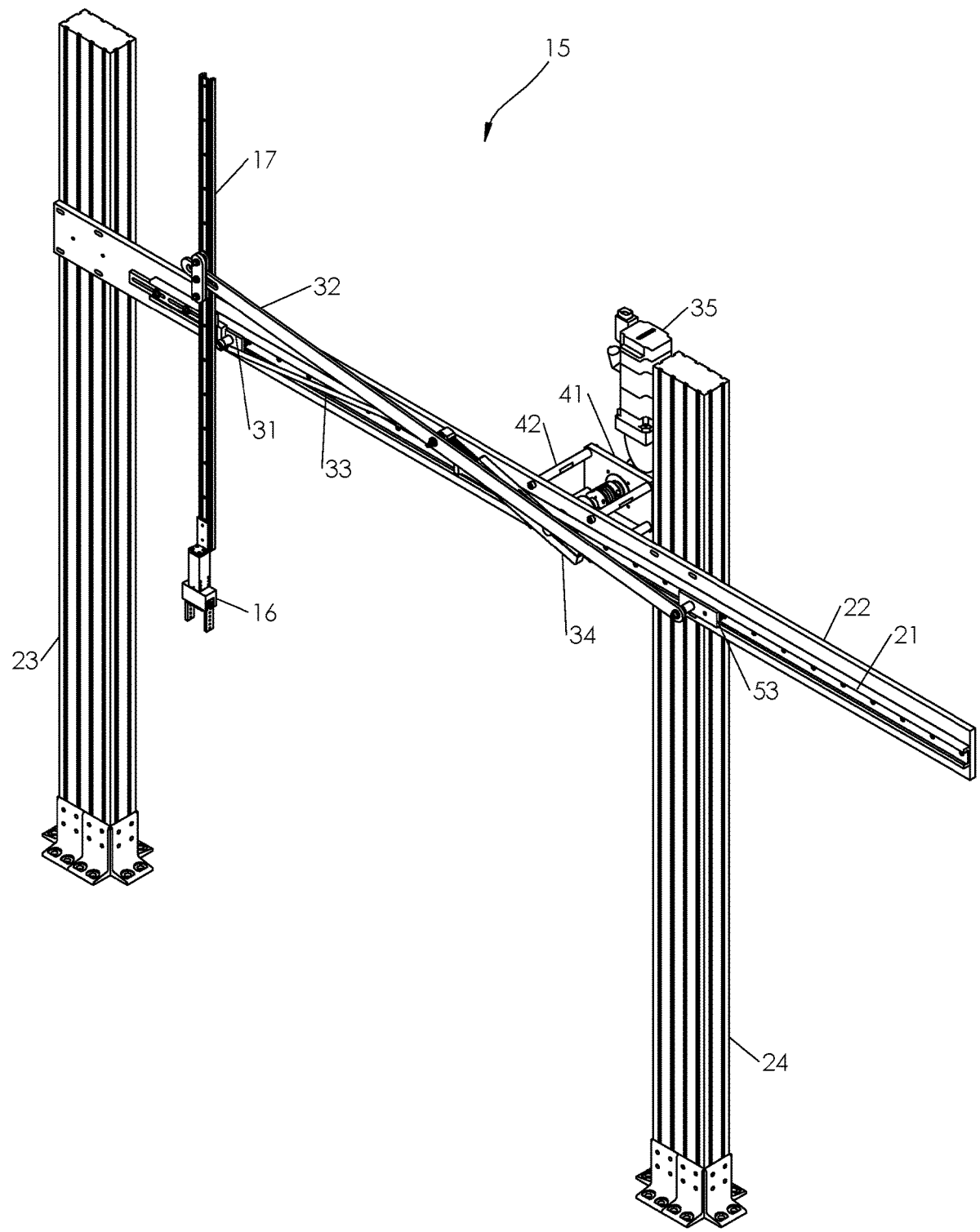
FIG. 1 is a perspective view of an embodiment of my pick and place device.

While my invention is susceptible to embodiments in many different forms, there is shown in the drawings and herein described in detail, features, structures, or characteristics of my invention as demonstrated in various preferred embodiments. These embodiments are to be considered for illustrative purposes and as an exemplification of the principles of my invention and are not intended to limit the broad aspects of my invention to the specific embodiments illustrated herein. The features, structures, or characteristics of my invention as disclosed in any one preferred embodiment, for example, may be rearranged or combined with the features, structures or characteristics in any other embodiment. One skilled in the relevant art will also recognize that my invention may be practiced without one or more of the specific details, or with other methods, components, materials, and so forth. In other instances, well-known structures, materials, or operations are not shown or described in detail to avoid obscuring aspects of the invention.

FIG. 1 shows a preferred embodiment of my pick and place device 15, that picks up an object to be moved and releases it using a grabber tool 16. The grabber tool 16 can be any one of a variety of grabber tools on the market with the grabbing function accomplished using two grabbing arms, such as shown in FIG. 1, or multiple grabbing jaws, a vacuum on/off type suction cup or any of a variety of ways known to those skilled in the art. The arms or jaws of the grabber tool 16 can be operated electrically or pneumatically to close and grab hold of the object to be moved and to open and release the object to be moved. In case of a suction cup, vacuum suction would be supplied from a source that could be switched on and off, thus causing the suction cup to grab and release the object when required.

The grabber tool 16 is attached to the lower end of a vertical guide rail 17. The vertical guide rail 17, in turn, is connected to various components and linkages to control its motion vertically and horizontally carrying the grabber tool 16 from its original location picking up an object to be moved to its final location where the object being moved is placed. In my preferred embodiment the contour of the vertical guide rail is C-shaped, where a secured slider member can be engulfed within the C-shaped configuration and the vertical guide rail can be guided by and slide along the slider member.

The vertical guide rail 17 is supported and guided in the horizontal direction by a horizontal guide rail 21. The horizontal guide rail 21 in my preferred embodiment is also C-shaped, as is the vertical guide rail 17, and allows for slider components to be engulfed within the C-shaped configuration and slide along the length of the rail. In the preferred embodiment shown in FIG. 1 the horizontal guide rail 21 is itself supported by a horizontal support member 22, a first vertical support member 23 and a second vertical support member 24. The vertical support members are spaced apart and positioned on or connected to the floor or similar platform, and the horizontal support member 22 extends between and is attached to the vertical support members 23 and 24. In the preferred embodiment shown in the drawings the horizontal support member 22 is a flat plate, with a flat side of the plate up against and attached to the vertical support members 23 and 24 with screws and bolts or by any other appropriate connecting means. It will be recognized by those skilled in the art that the horizontal support member 22 can have a variety of configurations other than a flat plate. In my preferred embodiment the object to be picked up and placed by my pick and place device will be picked up below the horizontal guide rail 21 and between the vertical support members 23 and 24, ascend to clear any other objects or existing obstacles, moved horizontally under and in line with the horizontal guide rail 21, and then descend to be placed in another position between the vertical support members 23 and 24 and below the horizontal guide rail 21. It is recognized, however, that the horizontal guide rail can be supported by means other than the horizontal and vertical support members described above, such as being cantilevered from a single vertical member or wall whereby the object to be picked up can be anywhere underneath the horizontal guide rail 21.

The vertical and horizontal motion of the vertical guide rail 17 and attached grabber tool 16 are controlled by various components and linkages configured as described below. In particular, the vertical motion is guided by a vertical slider 51 (shown in FIG. 2) configured to slide within the C-shaped contours of vertical guide rail 17 as the vertical guide rail 17 moves up and down. The horizontal motion of vertical guide rail 17 is guided by a first horizontal slider 31, with the latter attached to the vertical slider 51. First horizontal slider 31 is configured to slide horizontally within the C-shaped contours of horizontal guide rail 21 and will move with the vertical guide rail 17 in the horizontal direction. First and second horizontal stop members, 25 and 26 (shown in FIG. 2), respectively, are secured within the C-shaped contours of horizontal guide rail 21 on either side of the first horizontal slider 31 and will stop and limit the horizontal travel of the first horizontal slider 31 when the first horizontal slider 31 abuts the first horizontal stop member 25 when going to the left as viewed in FIGS. 1 and 2, or abuts the second horizontal stop member 26 when going to the right as viewed in FIGS. 1 and 2. In this manner, the horizontal stop members 25 and 26 also limit the horizontal motion of the vertical guide rail 17 and the attached grabber tool 16. The linkages controlling the vertical and horizontal motion of the vertical guide rail 17 and attached grabber tool 16 shown in FIG. 1 include a rotatable actuator arm 32, a rotatable rod 33, and a rotatable spring-loaded compliant lever 34. The compliant lever 34 is rotatably driven and speed-controlled by rotation of a motor 35 and accompanying linkages as explained in more detail below.

Figure 2:
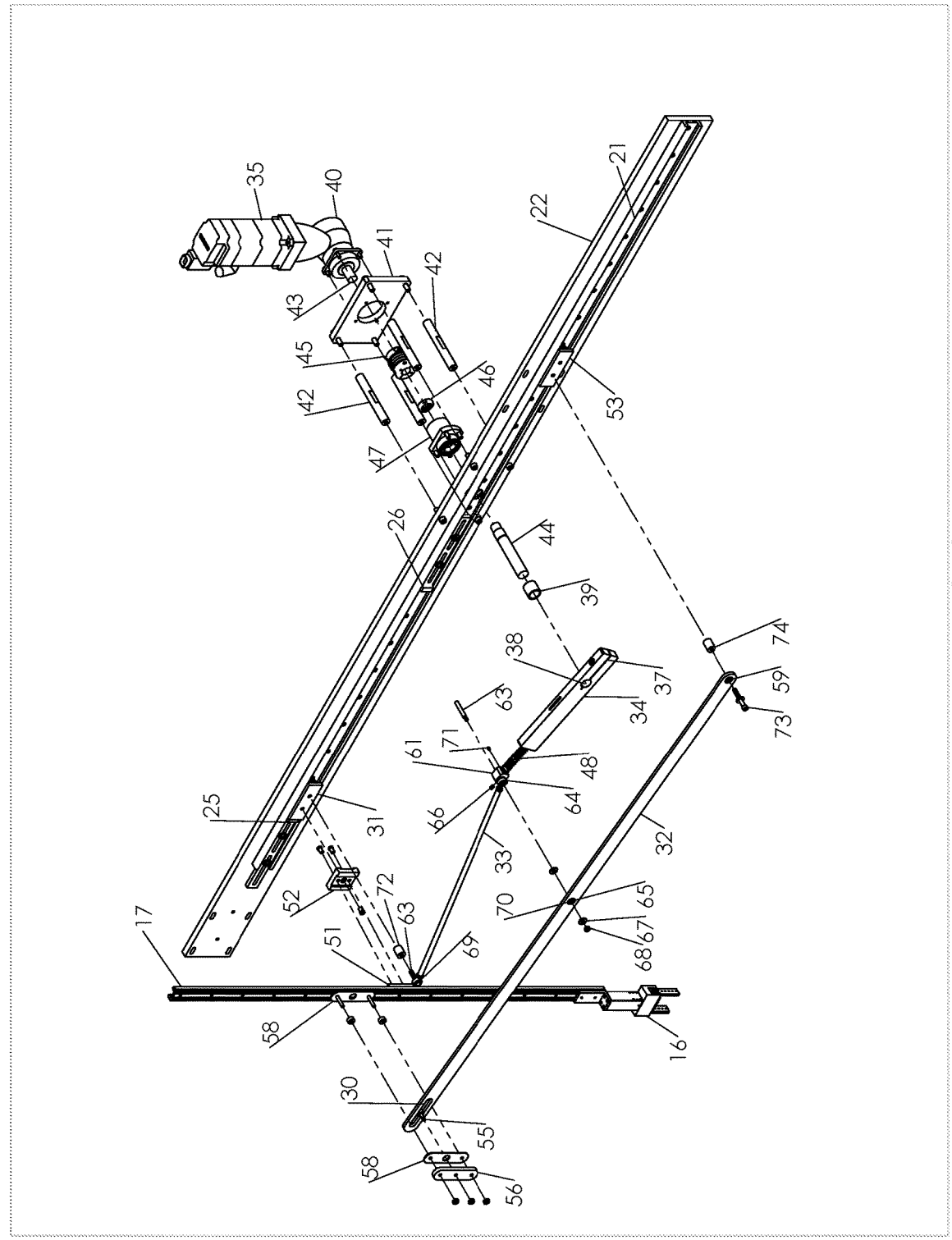
FIG. 2 is a partial exploded perspective view of the embodiment of FIG. 1 of my pick and place device.

FIG. 2 shows the assembly and attachments of the controlling linkages and components of the preferred embodiment of my invention. The motor 35 used to impart motion to the linkages in my preferred embodiment is a servomotor, which can be operated to provide a clockwise or counterclockwise output. It is supported by a gearhead 40 and gearhead mounting plate 41 and is offset from the main horizontal support member 22 by standoff rods 42. The servo-motor 35 provides power and speed to a gearhead output shaft 43 that transmits rotation through an overload protection coupling 45 to a rotary shaft 44, which rotary shaft extends through a bearing locknut 46, a set of ball bearings (not shown) within bearing housing 47, the horizontal support member 22 and the horizontal guide member 21. The free end of rotary shaft 44 extends through the horizontal support member 22, through horizontal guide rail 21, and through a spacer 39 and is secured within a hole 38 in the compliant lever 34. Spacer 39 provides appropriate clearance between the compliant lever 34 and the horizontal guide rail 21. The end of the compliant lever 34 with hole 38 has a slot 37 extending therethrough and extending through the hole 38 as shown in FIG. 2 and, in more detail, in FIGS. 3A and 3B, whereby the end of the compliant lever 34 can be compressed around and secure rotary shaft 44 with a bolt 36 pulling the end of the compliant lever on either side of the slot 37 together. With the rotary shaft 44 securely held within compliant lever 34, the compliant lever can be moved in a clockwise or counterclockwise manner by the rotary shaft 44 and the reversible nature of the servo-motor 35. It is recognized, however, that other means, such as a set screw, can be used instead of the aforementioned slot and bolt to secure rotary shaft 44 to compliant lever 34, and that a rotary pneumatic device can be used instead of the servo-motor-gearset system described above to rotate rotary shaft 44.

As also shown in FIG. 2, the vertical guide rail 17 is supported and connected at two locations: (1) its C-shaped contour is configured to engulf and slide along a vertical slider 51, and (2) it is rotatably connected to a first end of the actuator arm 32. These two connections guide and drive the vertical guide rail in its vertical motion. In particular, as referenced above, the vertical guide rail 17 can move and is guided in a vertical motion by sliding along the vertical slider 51, the latter being held at the vertical position of the horizontal guide rail 21 by being secured directly, or through an adaptor plate 52, to the first horizontal slider 31. The vertical guide rail is also rotatably connected to the first end of the actuator arm 32. In addition to rotation, this tie also allows an additional degree of freedom of the vertical guide rail connecting point along the actuator arm 32. The second end of actuator arm 32 is rotatably connected to a second horizontal slider 53, with the horizontal slider 53 configured to slide within the horizontal guide rail 21. The rotatable connection between the second end of actuator arm 32 and horizontal slider 53 is made with a ball joint insert 59 in a hole at the second end of the actuator arm 32 through which a pin 73 extends and is secured to the horizontal slider 53, although other well-known methods of making a rotatable connection can be used. Pin 73 also extends through spacer 74 providing clearance between the actuator arm 32 and horizontal slider 53. In this construction, when the actuator arm 32 rotates in a clockwise direction it will drive the vertical guide rail 17 up, and when the actuator arm 32 rotates in a counter-clockwise direction it will drive the vertical guide rail 17 down.

In my preferred embodiment shown in FIG. 2, the rotatable connection between the vertical guide rail 17 and the end of the actuator arm 32 is accomplished with a track roller 55 secured to the vertical guide rail 17 by means of a mount plate 56 and the roller portion located within an elongated slot 30 toward a first end of actuator arm 32. Two low friction pads 58 are mounted straddling the elongated slot 30, one mounted to the vertical guide rail 17 and the other mounted to the mount plate 56. It will be recognized by those skilled in the art that other forms of rotatable connections, able to provide the same effect, can also be used.

Figure 3A:
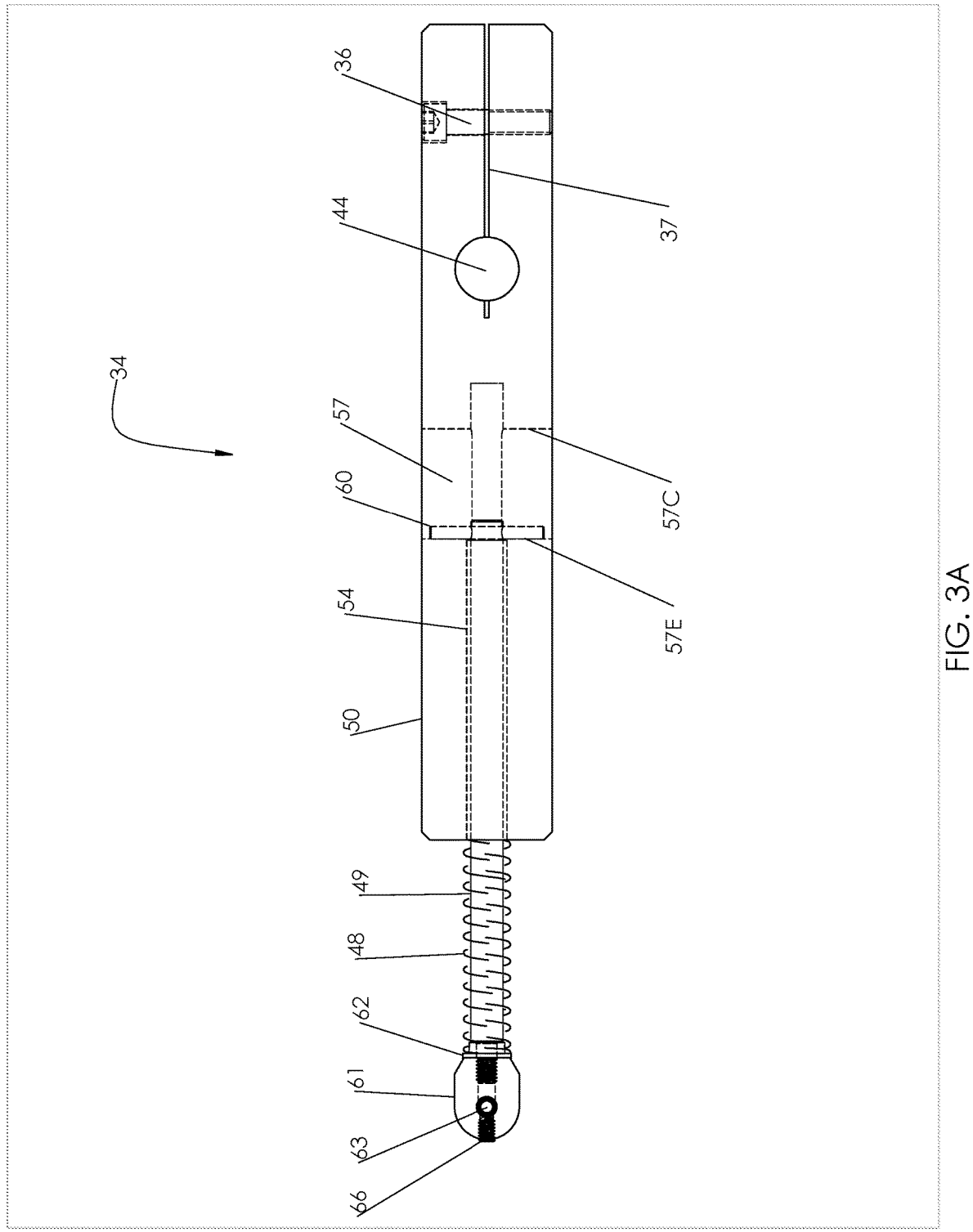
FIG. 3A shows a front view of the spring-loaded compliant lever of FIG. 1 in an elongated state.
Figure 3B:
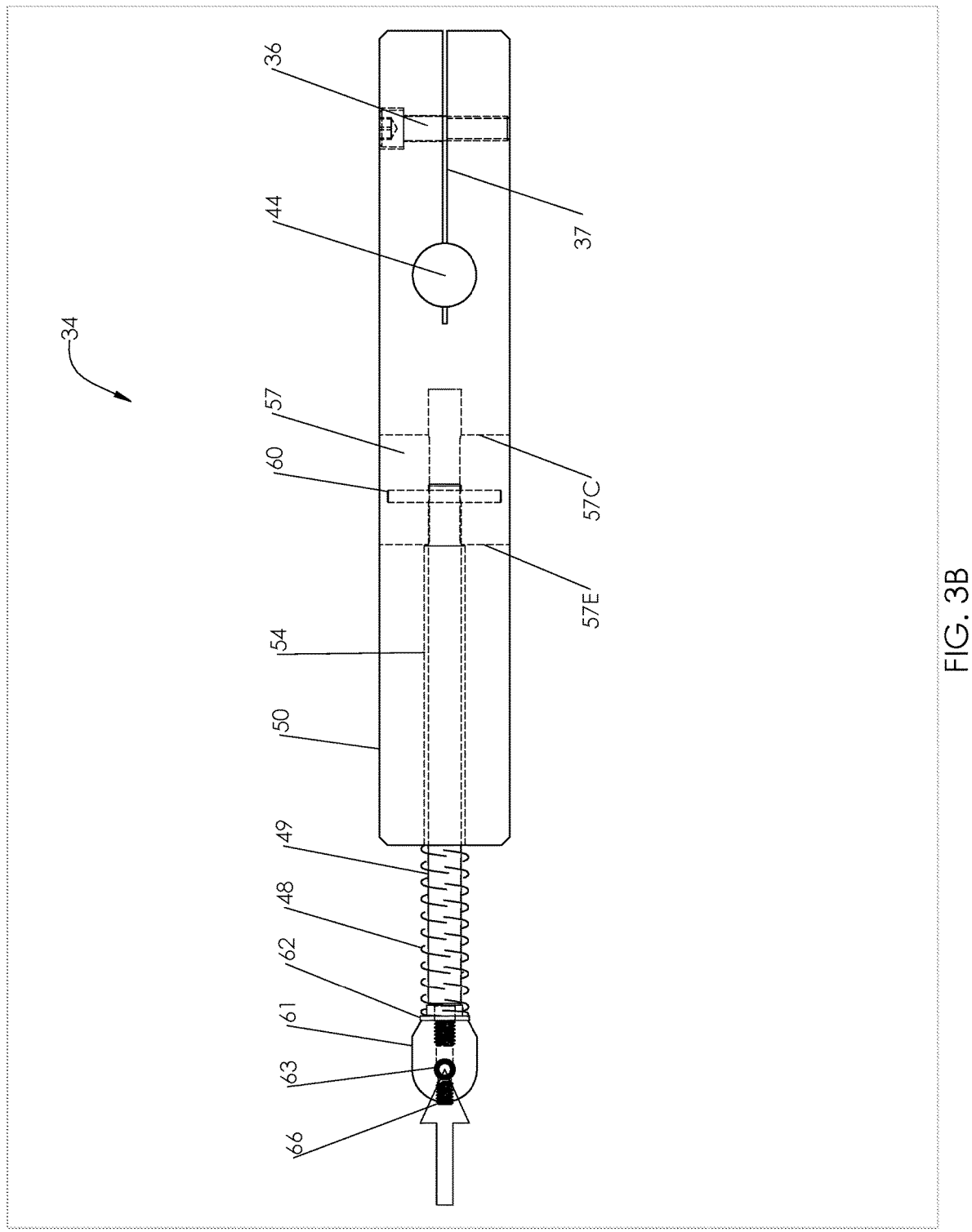
FIG. 3B shows a front view of the spring-loaded compliant lever of FIG. 1 shown in a partially compressed state.

As shown in FIG. 2 a biasing spring 48 is located at the end of the compliant lever 34 opposite the end with slot 37. As further shown in FIGS. 3A and 3B, the biasing spring surrounds an inner shaft 49 slidable within a sleeve bearing 54 pressed inside outer shell 50 of the compliant lever 34. The inner shaft 49 has one end connected to the outer shell 50 through a retaining/guiding feature comprised of a dowel pin 60 pressed into the inner shaft end and extending out from opposite sides of the inner shaft. The inner shaft sliding motion is limited within outer shell 50 by the pin 60 abutting an end 57E of elongated chamber 57 when the the compliant lever 34 is in its most elongated state, as shown in FIG. 3A. The connection between inner shaft 49 and outer shell 50 also keeps inner shaft from rotating relative to the outer shell 50 due to the pin 60 and elongated chamber 57 width tight (slip) fit. Clevis 61 is mounted at the threaded, opposite end of the inner shaft 49 and secured against rotating by setscrew 71 shown in FIG. 4. The biasing spring 48 is installed in preloaded state along with a seating ring 62 around inner shaft 49 and fills the space between the clevis 61 and outer shell 50. Extension of the biasing spring 48 elongates the compliant lever by pushing apart the clevis 61 and outer shell 50. Under a compression axial load on the compliant lever 34, such as due to the action of rod 33 when the first horizontal slider 31 abuts one of the horizontal stop members 25 or 26, the compliant lever 34 is shortened in length as inner shaft 49 slides within outer shell 50, biasing spring 48 compresses and the position of pin 60 shifts toward end 57C of elongated chamber 57 as shown in FIG. 3B. The length of the compliant lever 34 when loaded in compression is a direct function of the axial load magnitude that the compliant lever 34 is subjected to as a result of the forces generated in the linkage system at a given moment during the sequence of events. Compliant lever 34 will always be at the maximum predetermined length, as shown in FIG. 3A, as long as the force generated by the spring 48 in its preloaded state is greater than any axial load in compression that the compliant lever 34 is subjected to at a given time. Its total length will decrease as soon as the compression axial load generated by the linkage in the compliant lever 34 is greater than the load of the spring 48 in preloaded state. The amount of compression that the compliant lever 34 experiences during the service cycle can be varied by changing the spring rate, the length of the elongated chamber 57 and the like for different applications. In this manner, the compliant lever 34 can become longer or shorter under the outward biasing of spring 48 and the compression axial loads, respectively, as inner shaft 49 slides within outer shell 50.

Figure 4:
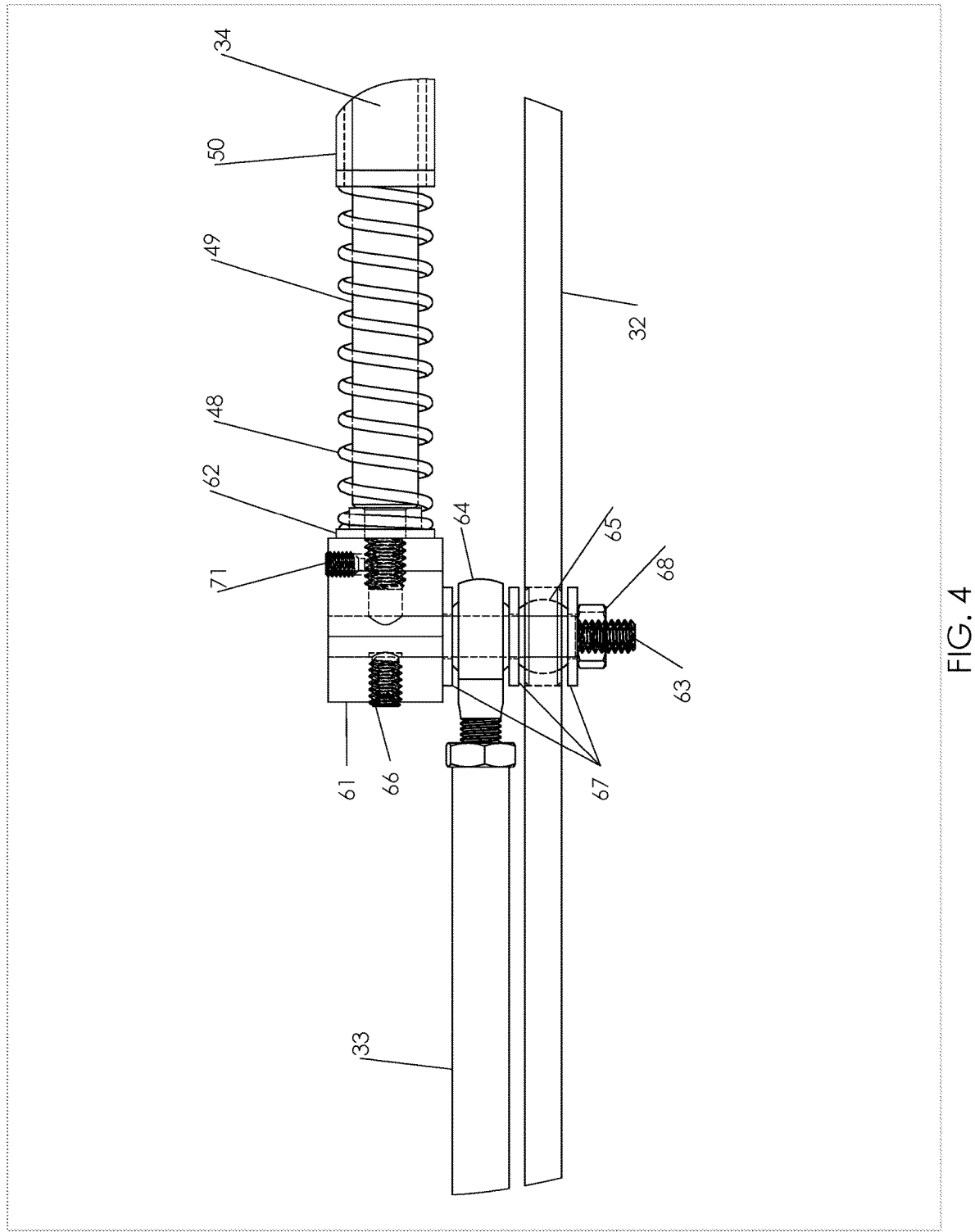
FIG. 4 is a partial plan view of the connection between the compliant lever, a rod and an actuator arm of the embodiment of FIG. 1.

The spring end of spring loaded compliant lever 34 is secured in a three-element rotatable connection to one end of rod 33 and a centrally located point 70 in actuator arm 32. This three-element rotatable connection in my preferred embodiment is best shown in FIG. 4. As shown, the rotatable connection is made by a threaded pin 63 that extends through the clevis 61, a ball joint 64 at the connecting end of rod 33, and a ball joint insert 65 in a hole at the centrally located point 70 in actuator arm 32. The threaded pin 63 is secured at the clevis 61 by a set screw 66, and at the side of actuator arm 32 opposite to the compliant lever 34 and rod 33 by a thrust washer 67 and a hex nut 68 secured around the threaded portion of threaded pin 63. Two more thrust washers 67 are used between these three elements for spacing.

While the threaded pin 63 provides for secure attachment, the thrust washers 67 facilitate alignment, and the ball joint 64 and the ball joint insert 65 allow for flexibility and any slight misalignment in the linkages. The efficiencies provided by these components are not necessary for my pick and place device and other well-known arrangements for a rotatable connection can be used, even if less efficient, including an unthreaded pin inserted (not shown) through holes at the rotatably connected ends of compliant lever 34 and rod 33 and at the connection centrally located point 70 in actuator arm 32 and secured with a simple cotter pin (not shown).

The end of rod 33 opposite the three-element connection is rotatably connected to the first horizontal slider 31. This connection, similar to the rotatable connection at the other end of rod 33, uses a ball joint 69 through which a pin 63 is inserted and then secured to the first horizontal slider 31. Rod 33 also extends through a spacer 72, which provides clearance between the first horizontal slider 31 and the ball joint 69.

Figure 5A:
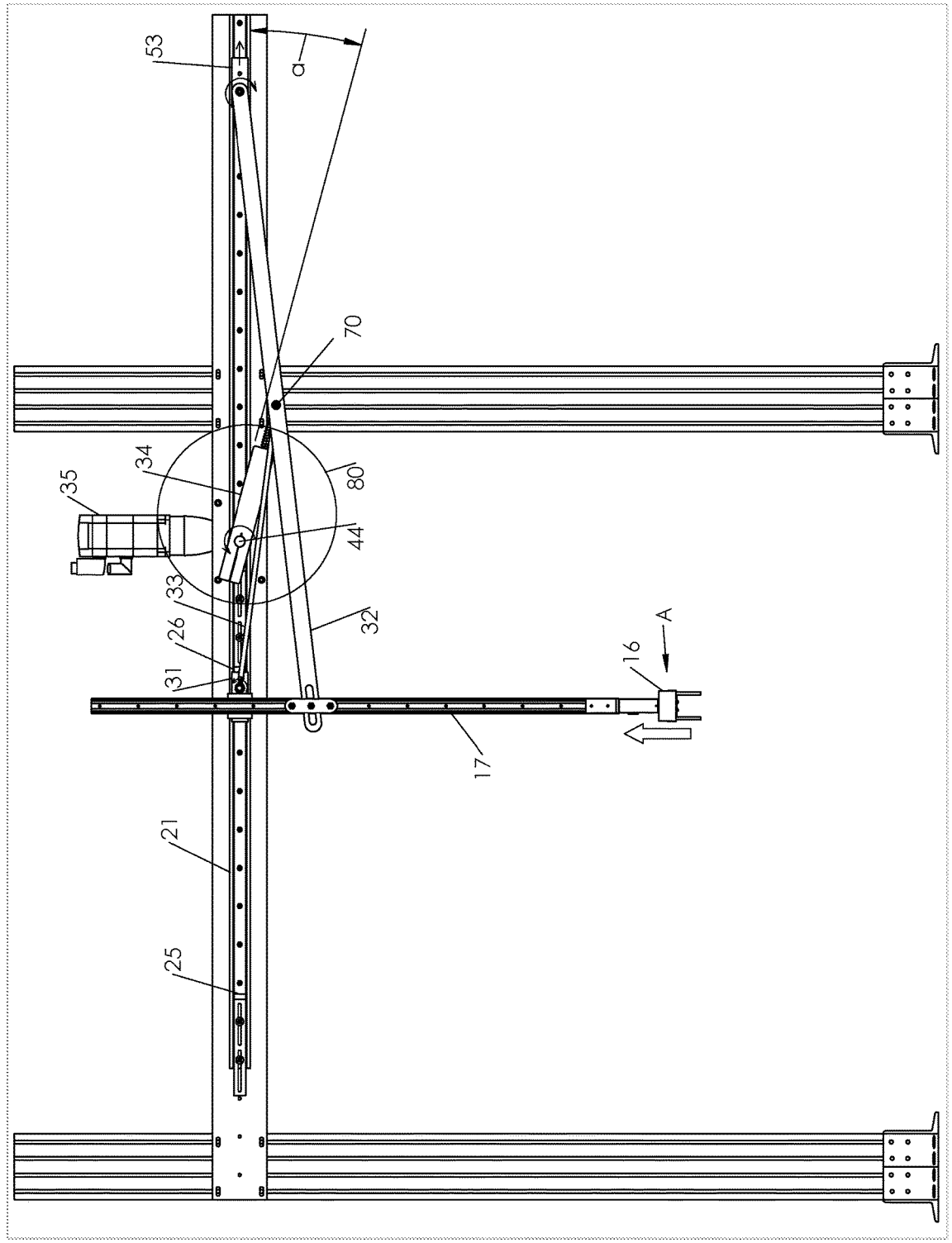
FIG. 5A is a front view of the embodiment of FIG. 1 of my pick and place device during the pick and place process, with a grabber tool at a position A.
Figure 5B:
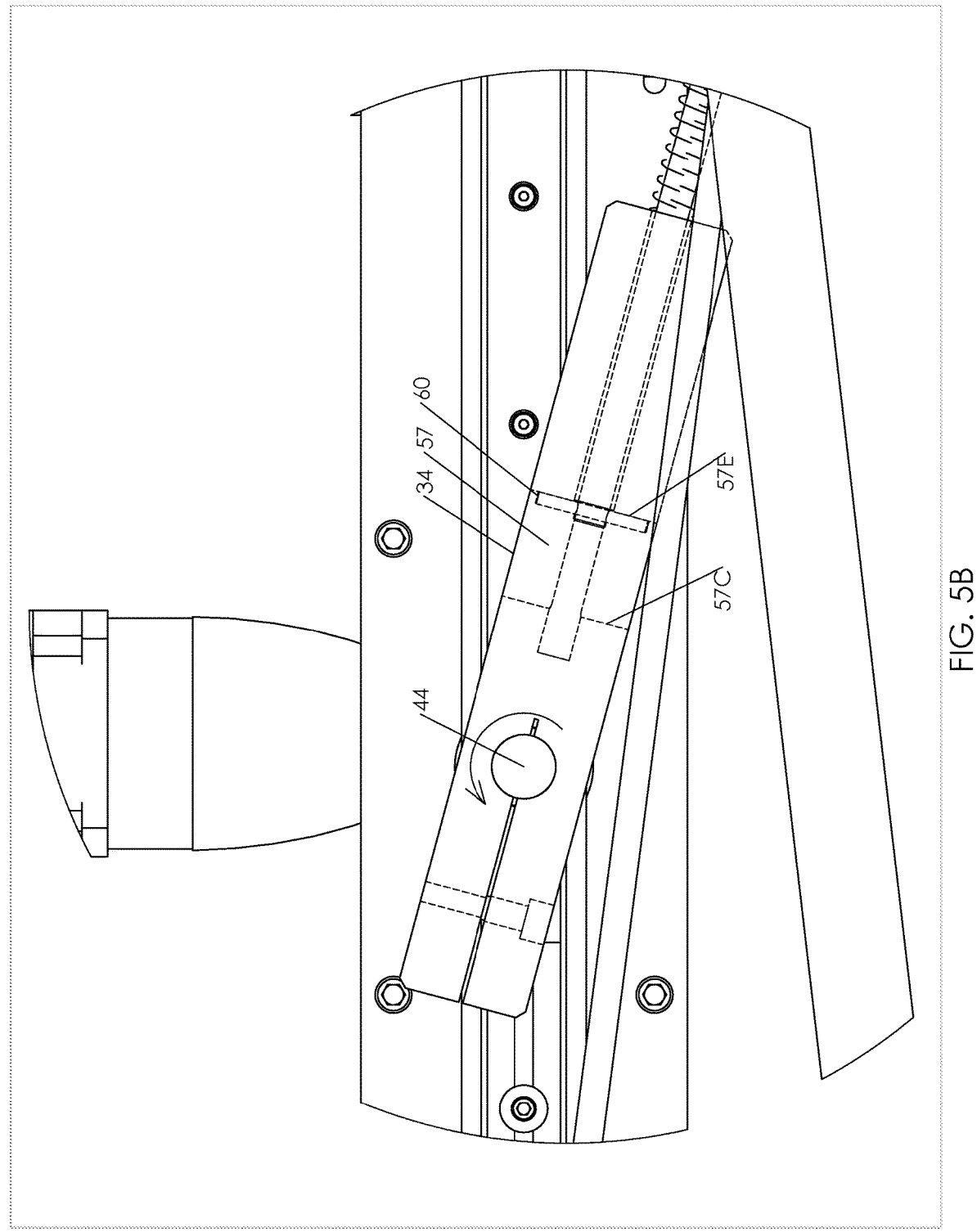
FIG. 5B is an enlarged detailed view of the components within the circled section 80 in FIG. 5A.
Figure 10A:
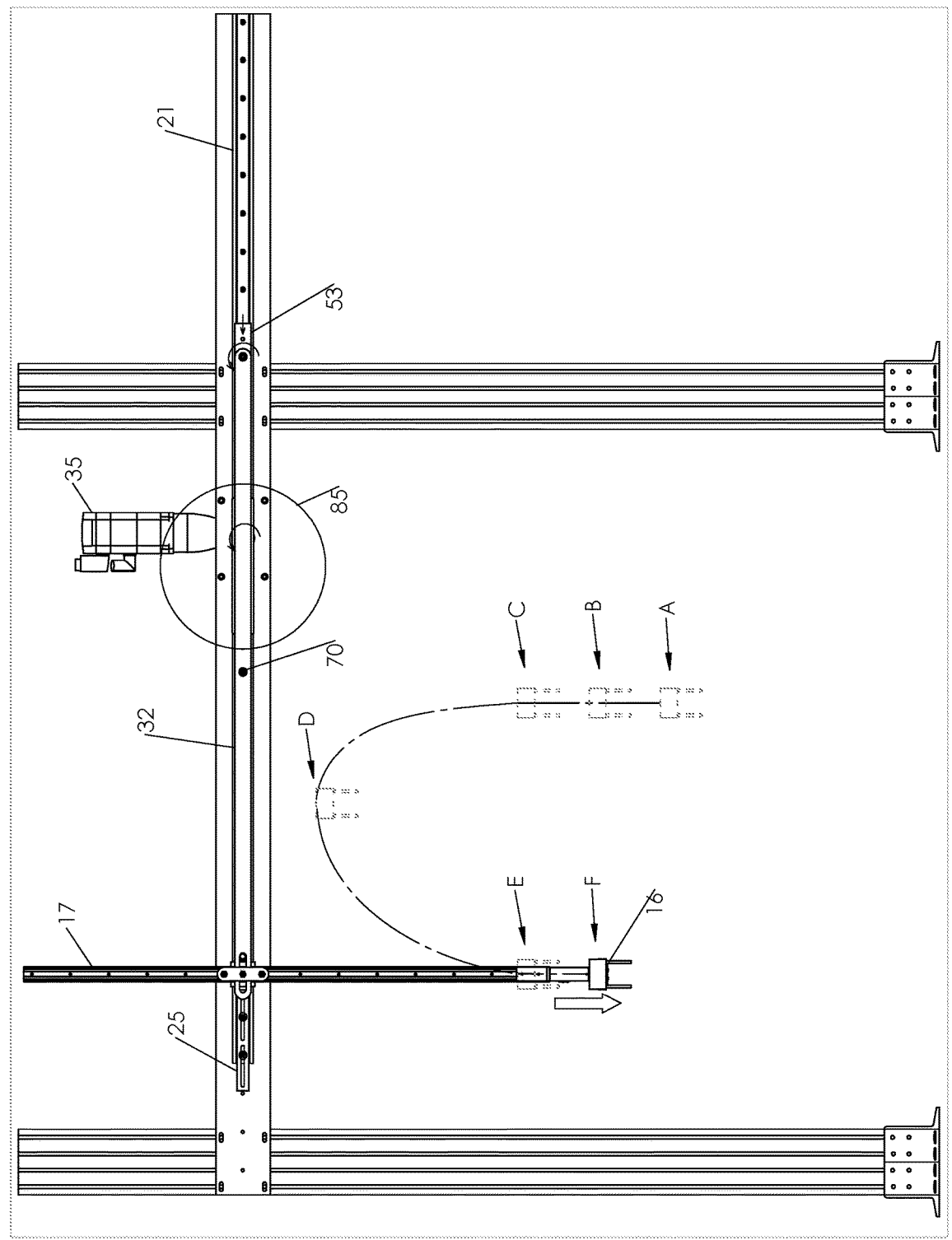
FIG. 10A is a front view of the embodiment of FIG. 1 of my pick and place device illustrating another position along the motion of the pick and place device, with a grabber tool at a position F.
Figure 10B:
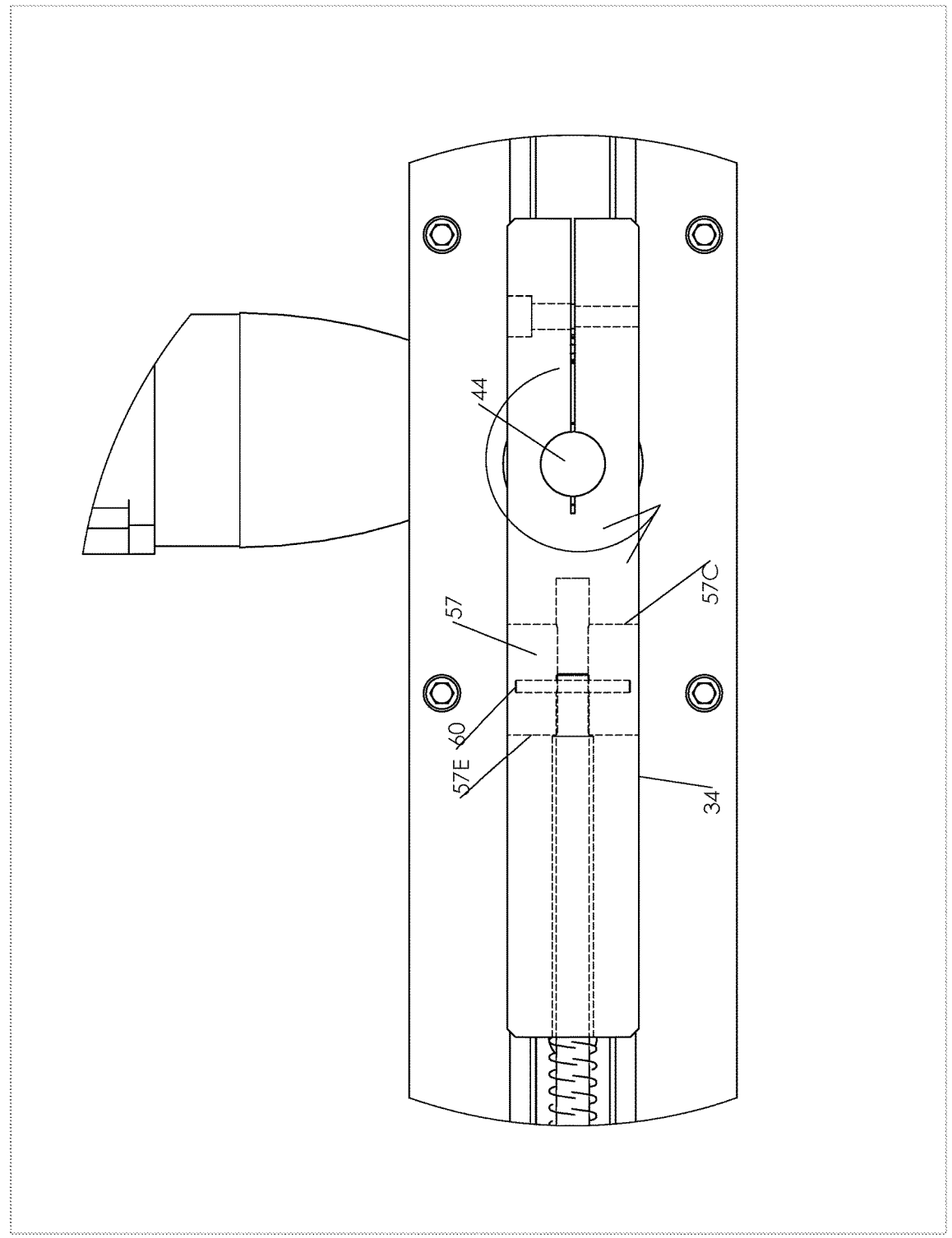
FIG. 10B is an enlarged detailed view of the components within the circled section 85 in FIG. 10A.
Figure 11A:
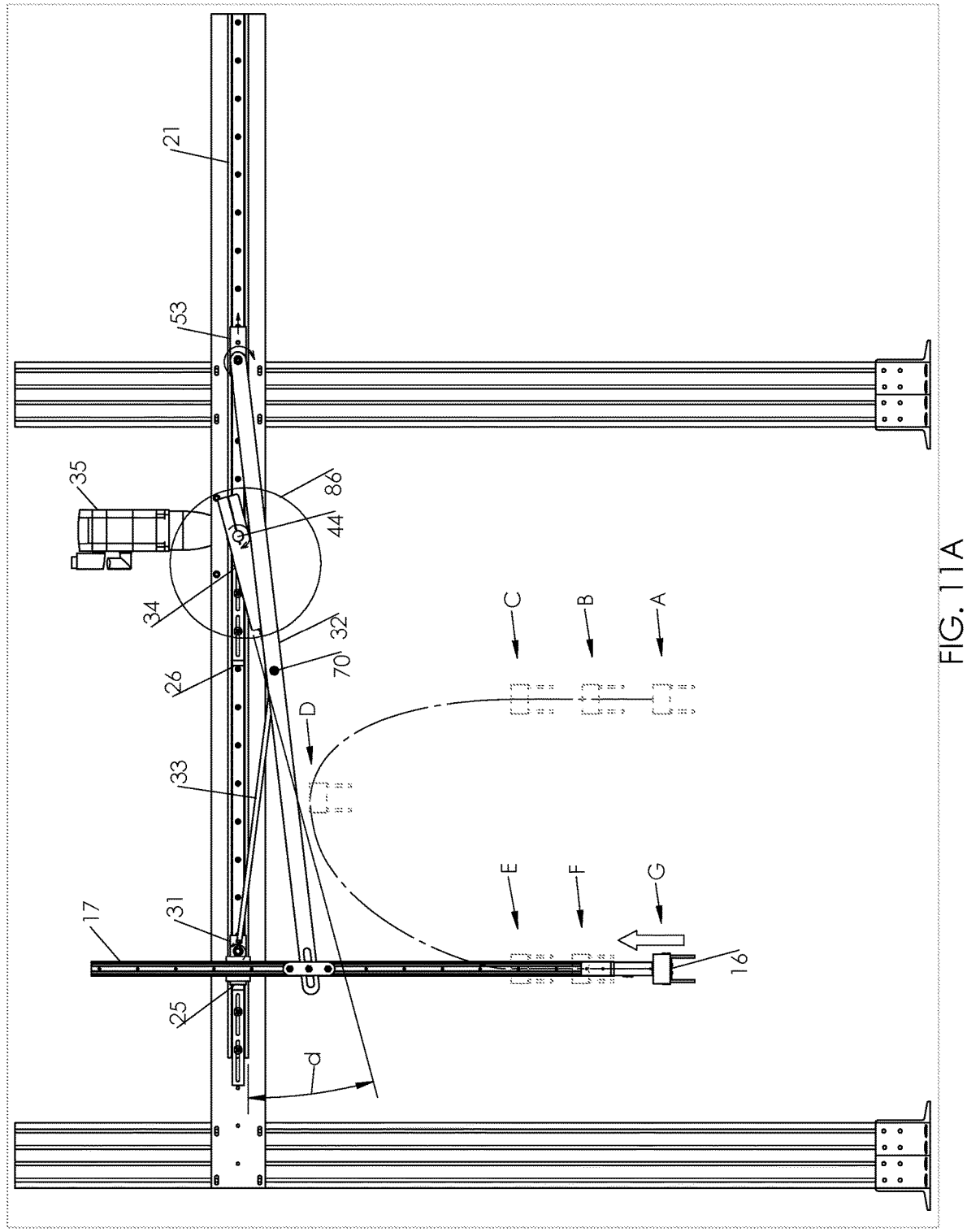
FIG. 11A illustrates a front view of the embodiment of FIG. 1 of my pick and place device illustrating another position along the motion of the pick and place device, with a grabber tool located at a position G.

With the above linkages in place, FIGS. 5-11 show the preferred embodiment of my pick and place device with the grabber tool 16 in various locations starting at the initial location labelled A in FIG. 5A where an object to be moved is grabbed, to the final location labelled G in FIG. 11A where the object to be moved is placed. As shown in FIG. 5A where the grabber tool 16 is in its initial location and to the farthest right as shown in that figure, the first horizontal slider 31 is abutting the second horizontal stop member 26 preventing the slider from going further to the right. In this position, there is also formed and shown an angle "a" between the compliant lever 34 and the horizontal guide rail 21 formed below horizontal guide rail 21. As shown in FIG. 5B, an enlarged detailed view of the components within callout 80 in FIG. 5A, a counterclockwise rotation of rotary shaft 44 causes a counterclockwise rotation of compliant lever 34. As the compliant lever 34 rotates counterclockwise, clevis 61 mounted at its end moves in a counterclockwise arc with the center at the axis of rotary shaft 44. This in turn, through the connection made by pin 63 extending through the clevis 61, the ball joint 64, and ball joint insert 65, rotates rod 33 counterclockwise. Ball joint 64 at the end of rod 33 will now describe an arc with the center on a point on the first horizontal slider 31. Since compliant lever 34 is shorter than rod 33, compliant lever will not only cause rod 33 to rotate counterclockwise but will also subject it to a pull force to the right which in turn will subject the first horizontal slider 31 to a pull force to the right as seen in FIG. 5A. The first horizontal slider 31 however cannot travel to the right due to the contact with fixed second horizontal stop member 26. Rod 33, which is now rotating around a fixed point of stationary first horizontal slider 31 will instead cause a pull force to the compliant lever 34 through pin 63 at three-element connection, forcing compliant lever 34 to compress. Consequently, centrally located point 70 on actuator arm 32 will rise on an arc trajectory described by ball joint 64 at the end of rod 33 causing actuator arm 32 to rotate clockwise around a point on horizontal slider 53, which will start to slide gently to the right along horizontal guide rail 21 at the same time. It is the clockwise rotation of actuator arm 32 that causes the ascension of the vertical guide rail 17 through the rotatable connection between actuator arm 32 and vertical guide rail 17 described above and it is the second horizontal stop member 26 keeping first horizontal slider 31 stationary that insures ascension of vertical guide rail 17 and grabber tool 16 in a straight vertical line.

Figure 6A:
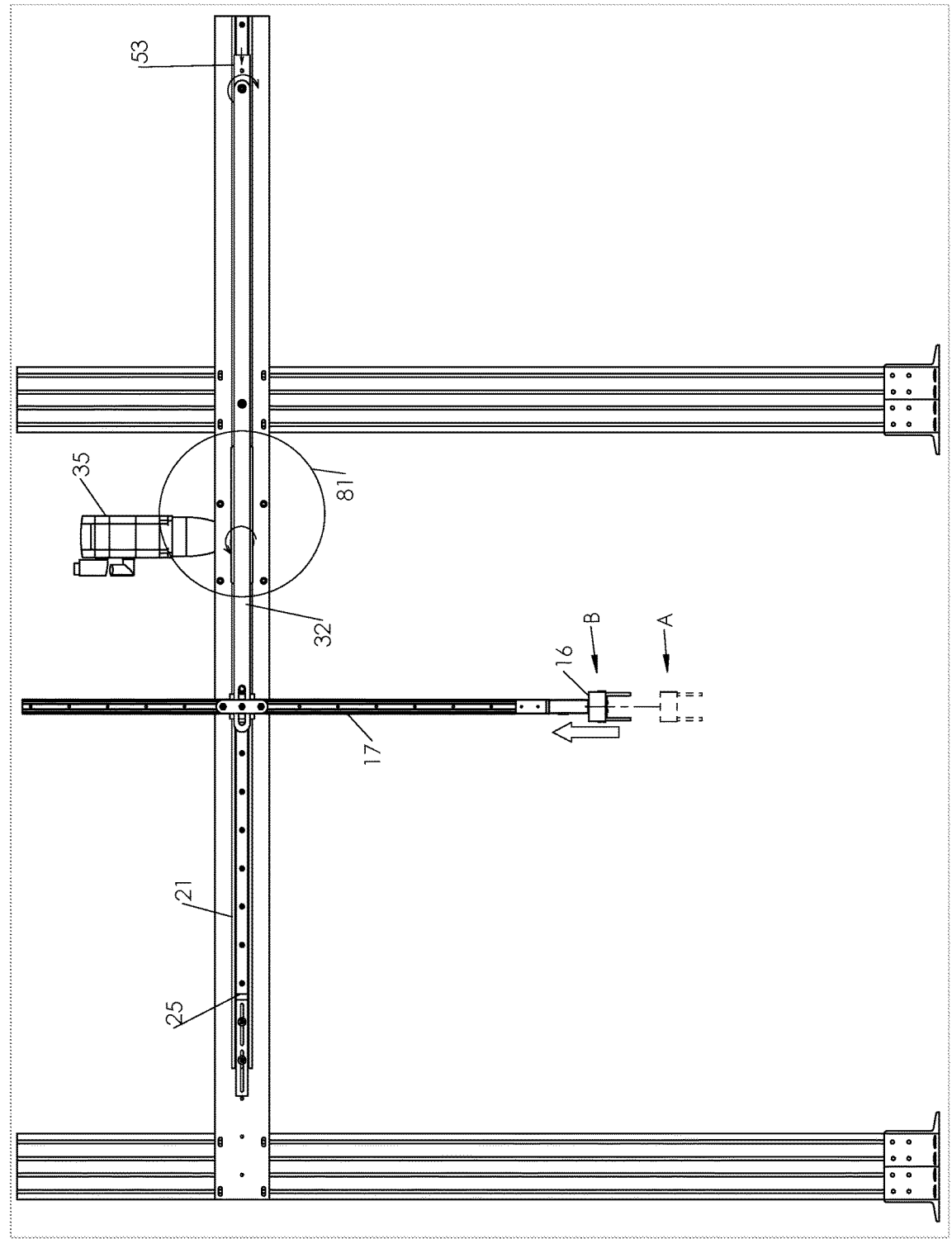
FIG. 6A is a front view of the embodiment of FIG. 1 of my pick and place device illustrating another position along the motion of the pick and place device, with a grabber tool at a position B.
Figure 6B:
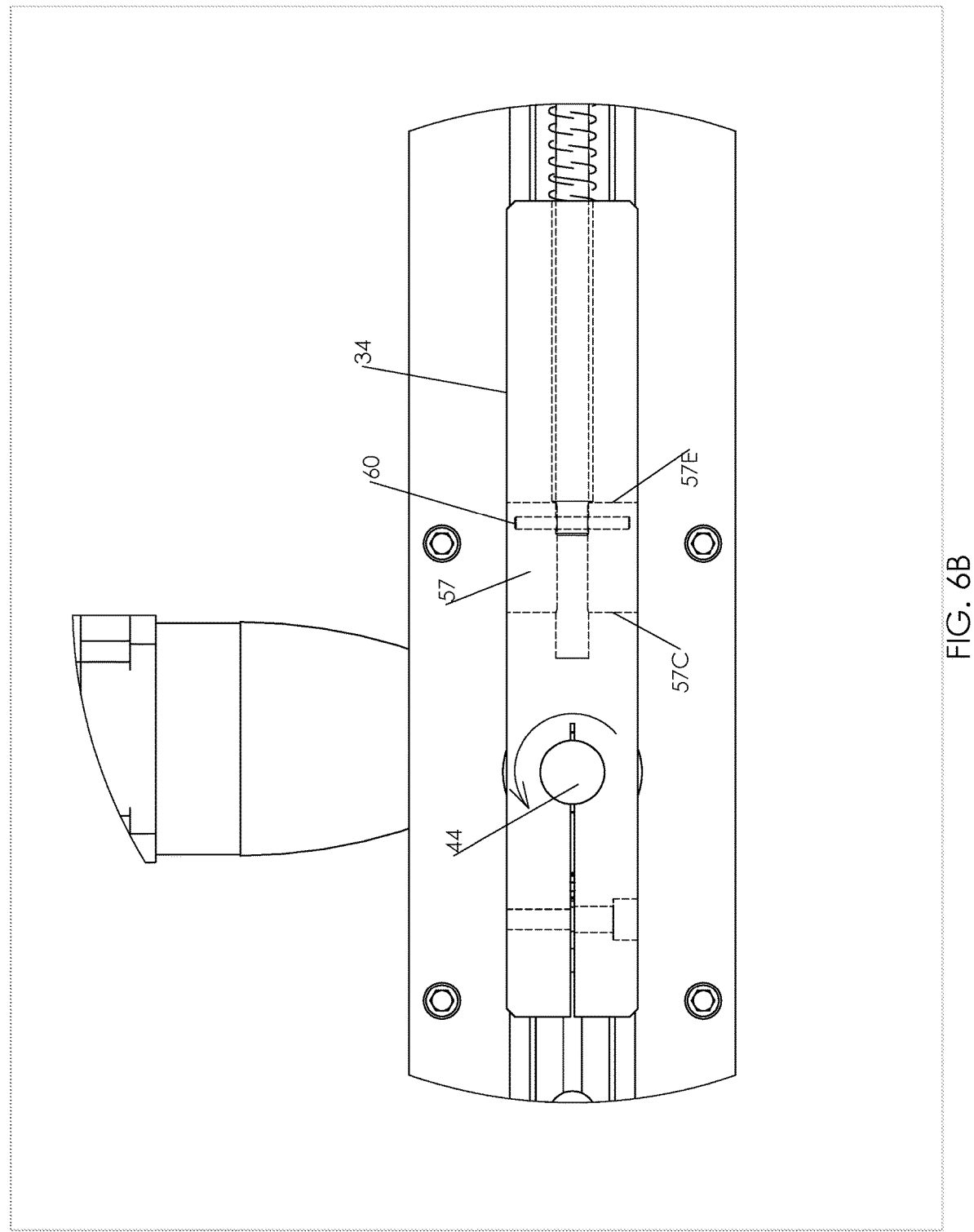
FIG. 6B is an enlarged detailed view of the components within the circled section 81 in FIG. 6A.

FIG. 6A shows the configuration of the preferred embodiment of my pick and place device as the rotary shaft 44 continues rotating in a counterclockwise direction, the first horizontal slider 31 still abuts second horizontal stop member 26 (not shown), and the grabber tool 16 continues vertically upward to location B. FIG. 6B shows an enlarged detailed view of the compressed compliant lever shown within callout 81 in FIG. 6A. Compliant lever 34, now compressed a predetermined amount continues to force the first horizontal slider 31 to remain stationary and abutted against second horizontal stop member 26. More specifically, rod 33 continues to rotate around the fixed point of stationary first horizontal slider 31 and will continue to cause a pull force to the compliant lever 34 through pin 63 at a three-element connection, forcing compliant lever 34 to get compressed a predetermined amount. Consequently, centrally located point 70 on actuator arm 32 will continue on the arc trajectory described by ball joint 64 at the end of rod 33 causing actuator arm 32 to rotate clockwise around a point on horizontal slider 53, which now stopped sliding to the right and will start sliding gently to the left along horizontal guide rail 21. It is the clockwise rotation of actuator arm 32 that causes the ascension of the vertical guide rail 17 through the rotatable connection described above and it is the second horizontal stop member 26 keeping the first horizontal slider 31 stationary that insures ascension of vertical guide rail 17 and grabber tool 16 in a straight vertical line.

Figure 7A:
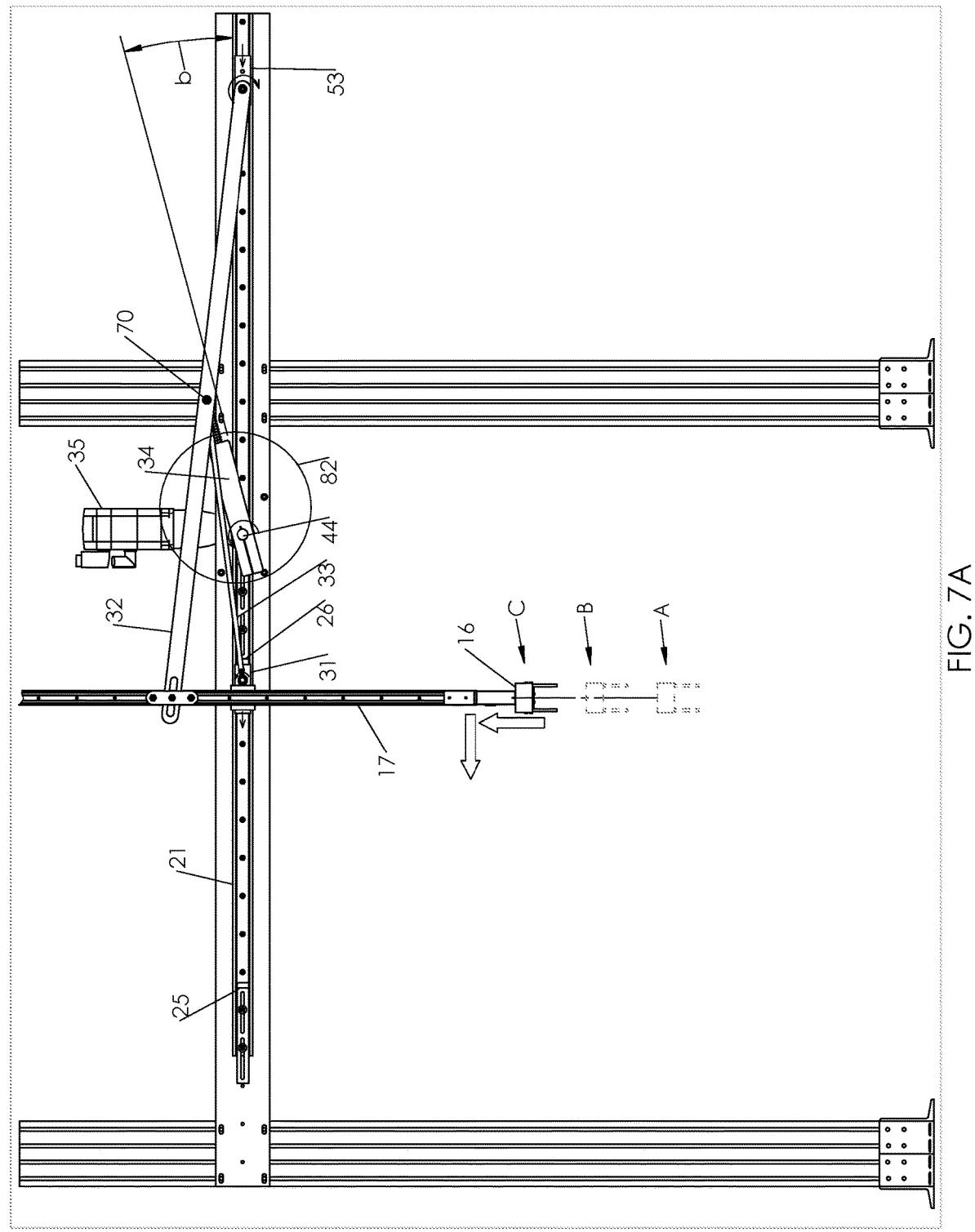
FIG. 7A is a front view of the embodiment of FIG. 1 of my pick and place device illustrating another position along the motion of the pick and place device, with a grabber tool at a position C.
Figure 7B:
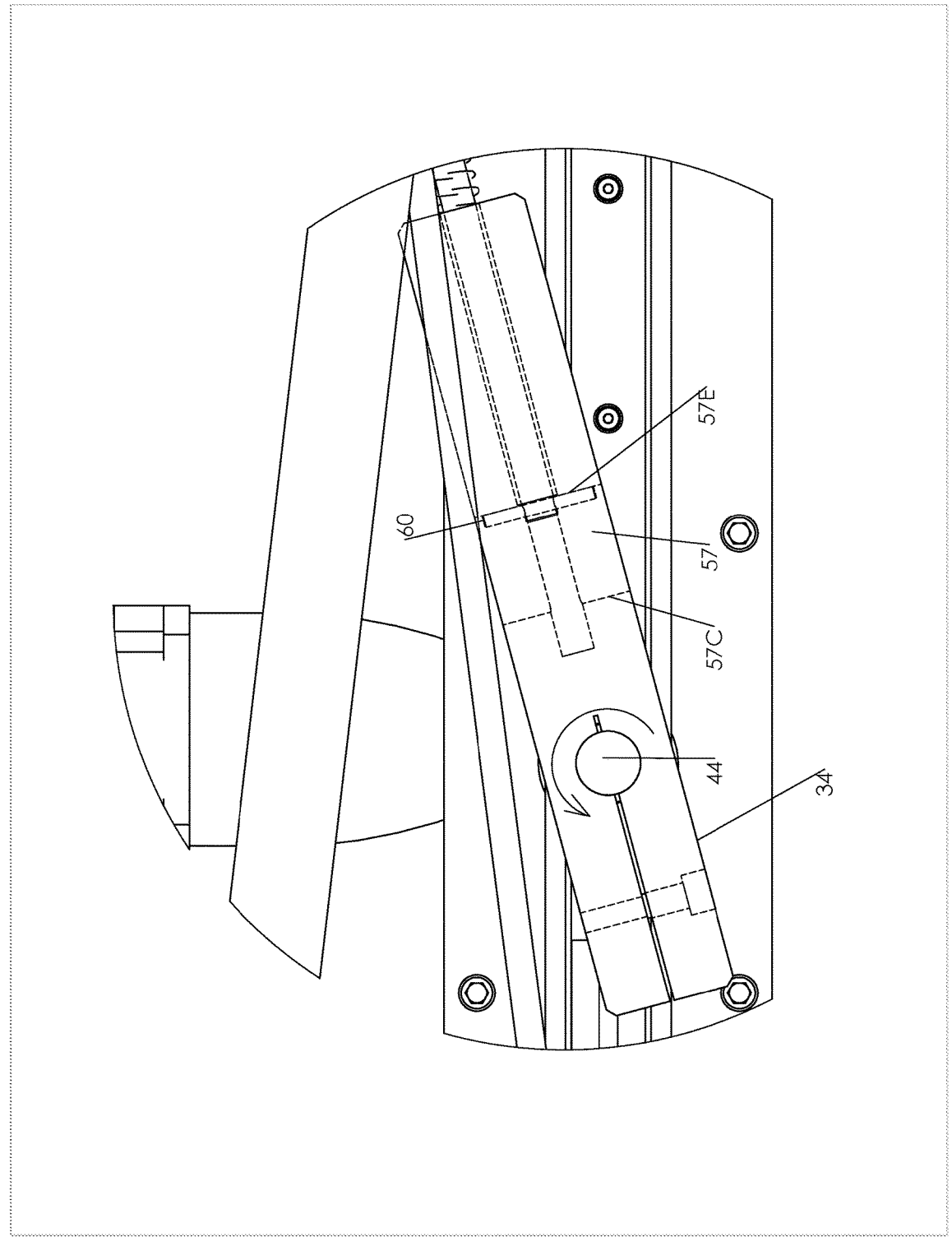
FIG. 7B is an enlarged detailed view of the components within the circled section 82 in FIG. 7A.

As shown in FIG. 7A, grabber tool 16 reaches its straight-line trajectory segment highest point C before starting to traverse in the horizontal direction to the left and continue to rise. At this point the first horizontal slider 31 is still in contact with the second horizontal stop member 26 and the compliant lever has extended back to its maximum length. In this position, an angle "b" between the compliant lever 34 and the horizontal guide rail 21 is formed above the horizontal guide rail 21. As the rotary shaft 44 continues its counterclockwise rotation from the position in FIG. 7A it will cause compliant lever 34 to rotate counterclockwise. As the compliant lever 34 rotates counterclockwise, clevis 61 mounted at its end will describe an arc with the center at rotary shaft 44 axis. Consequently, centrally located point 70 on actuator arm 32 (due to the three-element connection) will rise and move to the left following the arc trajectory, which will push rod 33 to the left (while rotating counterclockwise), causing the first horizontal slider 31 to begin to separate from second horizontal stop member 26 and to start sliding to the left along horizontal guide rail 21. As centrally located point 70 on actuator arm 32 rises and moves to the left it will also cause actuator arm 32 to continue to rotate in a clockwise direction, which will cause vertical guide rail 17 and grabber tool 16 to continue rising but also start moving in a horizontal direction to the left. Horizontal slider 53 will keep sliding to the left along horizontal guide rail 21. FIG. 7B shows an enlarged decompressed compliant lever callout 82 where the compliant lever 34 has decompressed and it is now positively back to maximum length state.

Figure 8A:
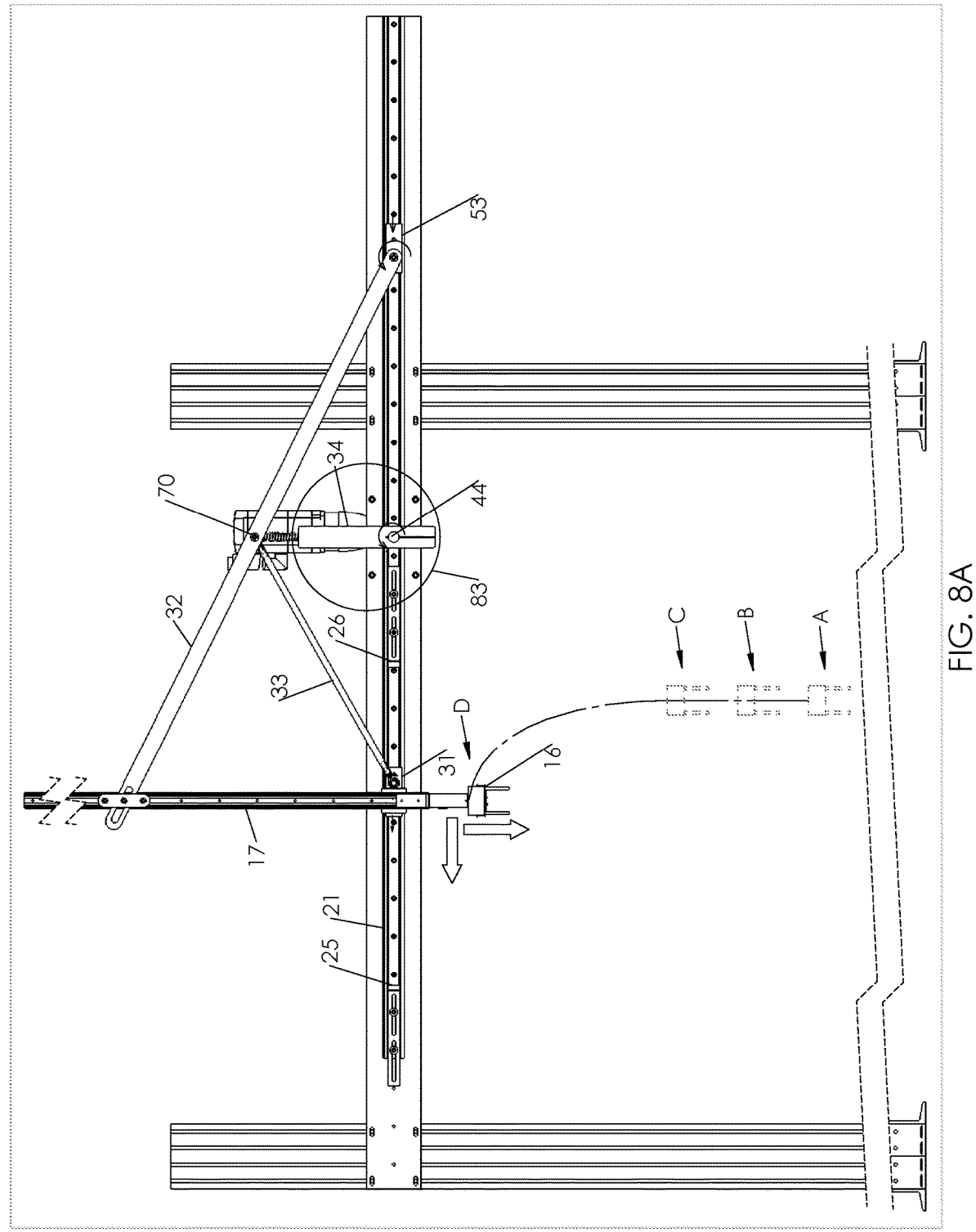
FIG. 8A is a front view of the embodiment of FIG. 1 of my pick and place device illustrating another position along the motion of the pick and place device, with a grabber tool at a position D.
Figure 8B:
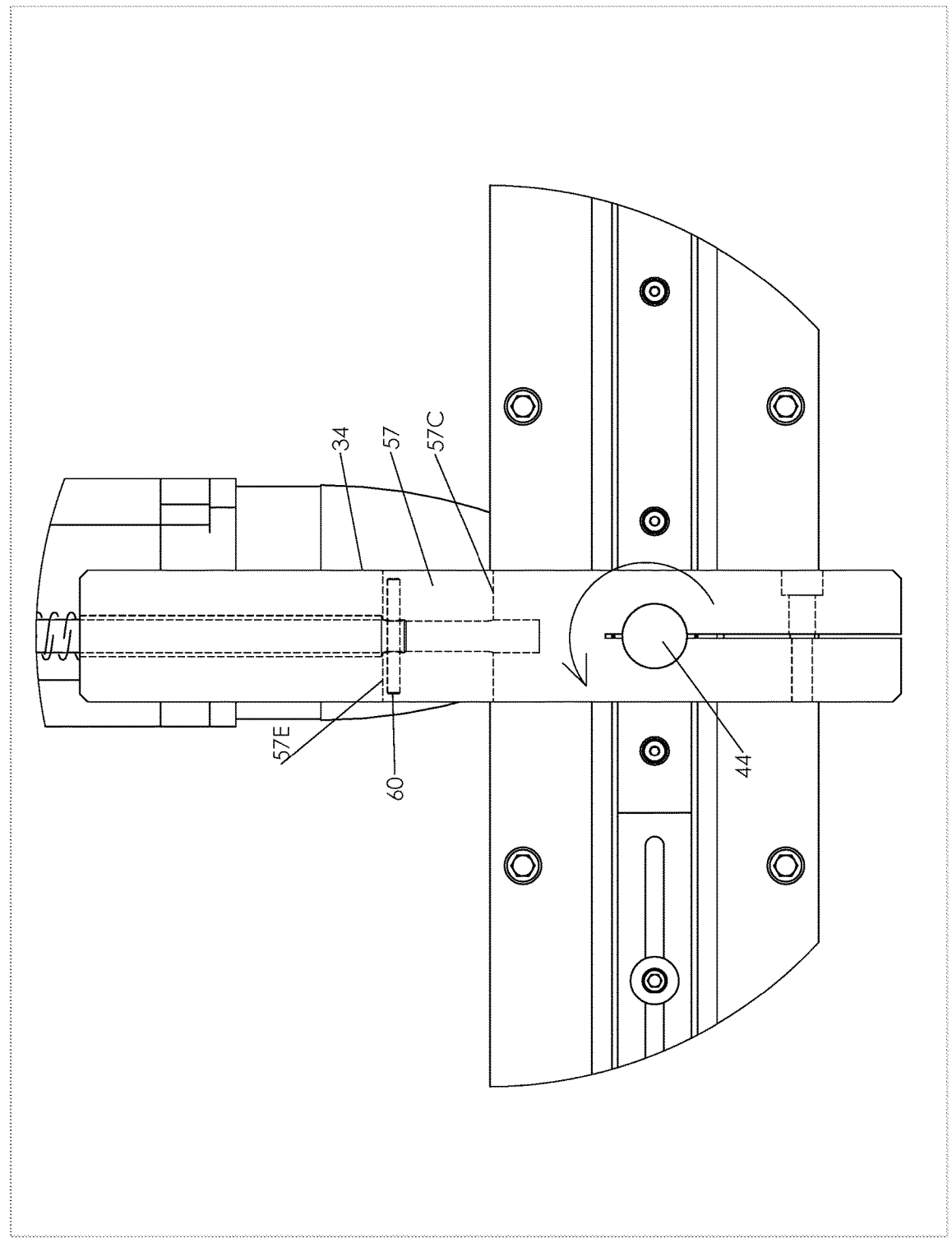
FIG. 8B is an enlarged detailed view of the components within the circled section 83 in FIG. 8A.

In FIG. 8A the grabber tool 16 has reached its highest vertical location D. The angle between the compliant lever 34 and the horizontal guide rail 21 has reached 90 degrees. Slightly before and after position D the compliant lever 34 will compress a small amount briefly if the vertical load caused by the weight of linkages, grabber tool 16 and payload combined gently exceeds the load of the compliant lever spring 48 in preloaded state. Compliant lever 34 will maintain its maximum length state from position C all the way to position E if compliant lever spring 48 load is greater than the compression axial load generated in the linkage during that time. Either way, balance of forces in the linkage changes shortly after position D and compliant lever 34 will positively be at maximum length state before grabber tool 16 reaches position E. As the rotary shaft 44 continues its counterclockwise rotation from the position in FIG. 8A, it will cause compliant lever 34 to rotate counterclockwise. As the compliant lever 34 rotates counterclockwise, clevis 61 mounted at its end will describe an arc with the center at rotary shaft 44 axis. Consequently, centrally located point 70 on actuator arm 32 (due to the three-element connection) will drop and move to the left, which will push rod 33 to the left (while rotating clockwise), causing the first horizontal slider 31 to continue sliding to the left. As centrally located point 70 on actuator arm 32 drops and moves to the left it will also cause actuator arm 32 to start rotating in a counterclockwise direction, which will cause vertical guide rail 17 and grabber tool 16 to start to descend and also to continue moving horizontally to the left. Horizontal slider 53 continues to slide to the left. FIG. 8B shows an enlarged compliant lever callout 83, from FIG. 8A where at this point, the compliant lever 34 may have compressed a small amount under an axial load for a very short period or it may have maintained its maximum length state. Both are acceptable conditions.

Figure 9A:
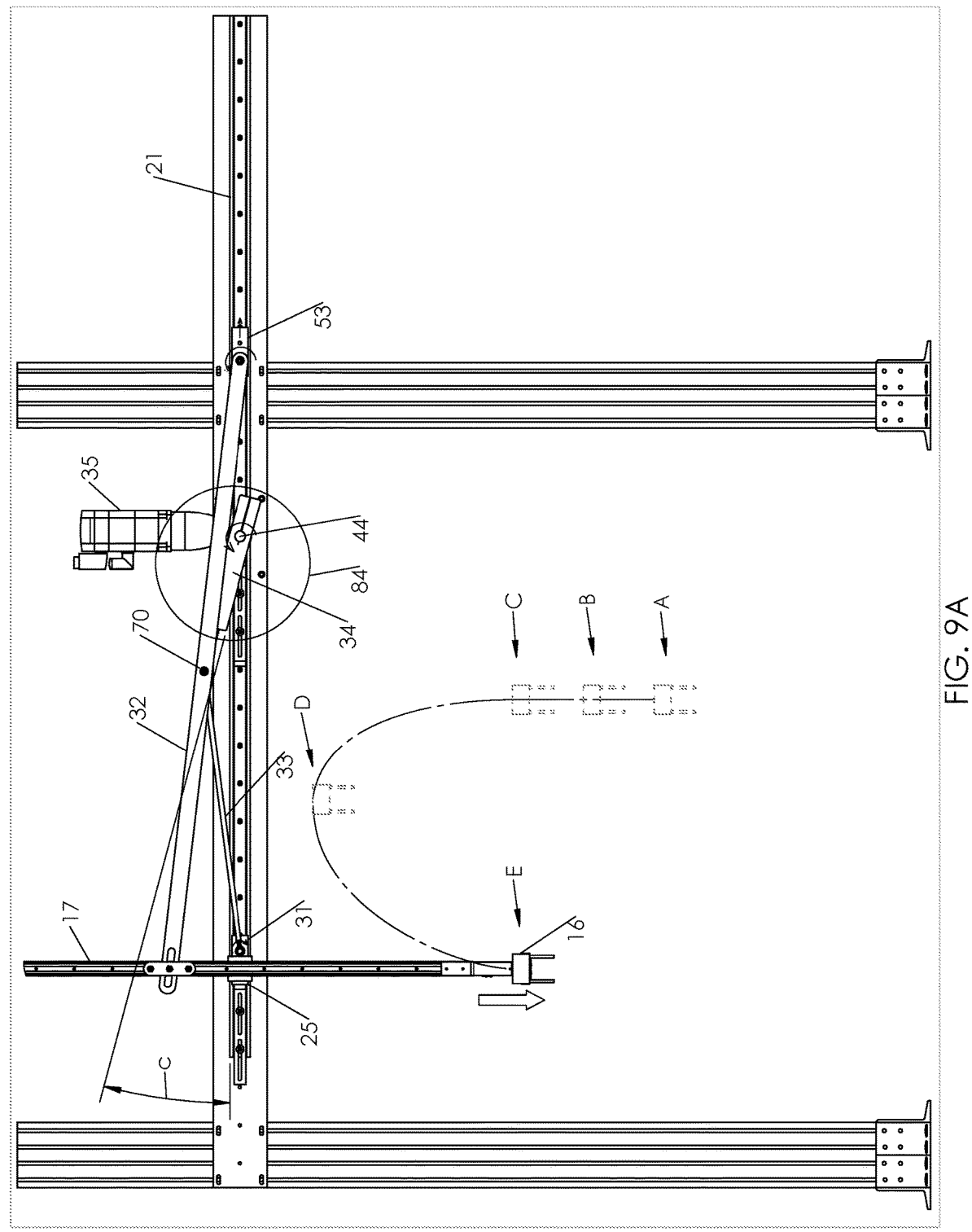
FIG. 9A illustrates a front view of the embodiment of FIG. 1 of my pick and place device illustrating another position along the motion of the pick and place device, with a grabber tool at a position E.
Figure 9B:
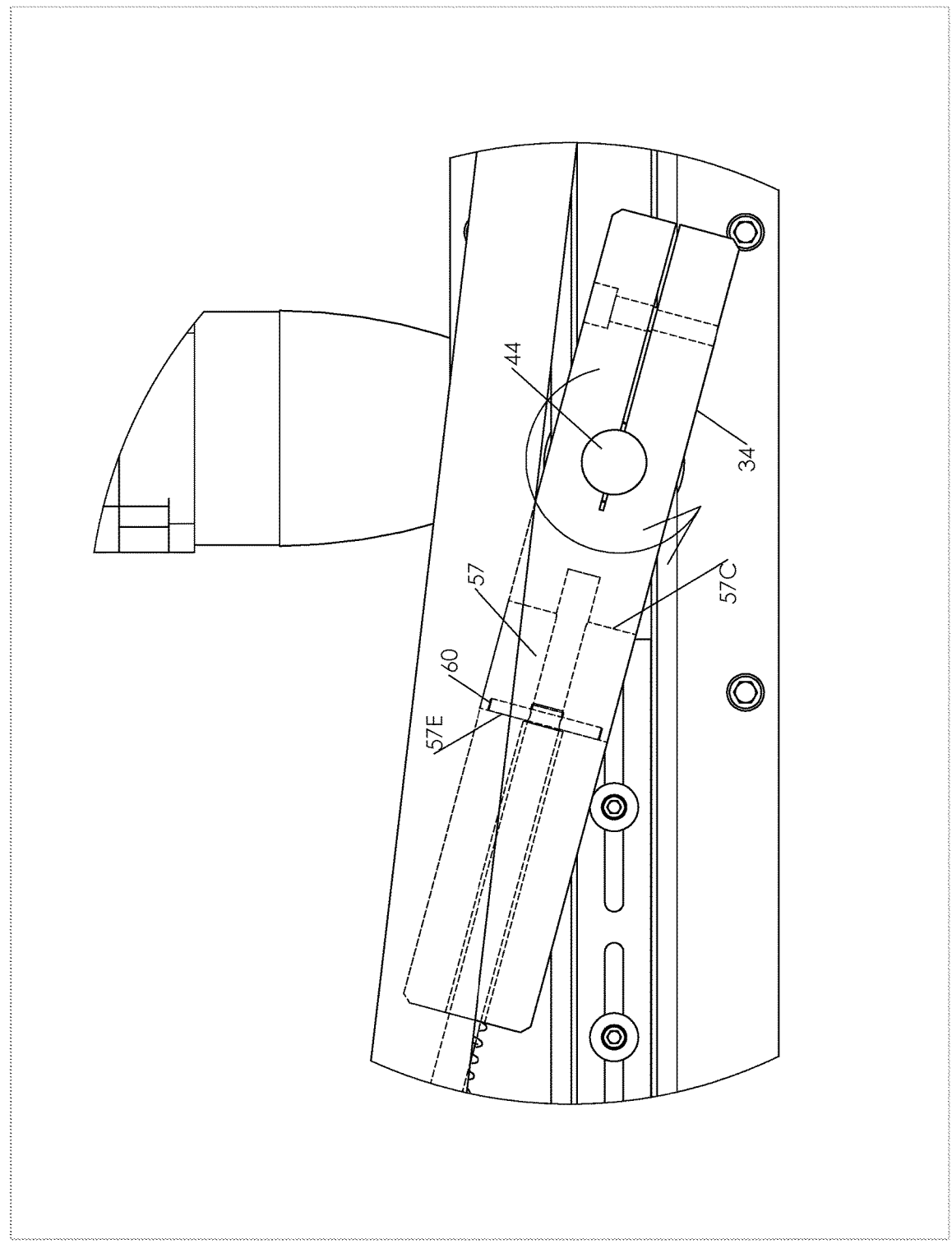
FIG. 9B is an enlarged detailed view of the components within the circled section 84 in FIG. 9A.

As the grabber tool 16 reaches location E as shown in FIG. 9A, the first horizontal slider 31 comes into contact and abuts the horizontal stop member 25 while the compliant lever 34 is in maximum length state and it will soon start to compress. At this position an angle "c" between the compliant lever 34 and horizontal guide rail 21 is formed above horizontal guide rail 21. As the compliant lever 34 rotates counterclockwise, clevis 61 mounted at its end would tend to describe an arc with the center at rotary shaft 44 axis. Connection between the pin 63 mounted in the clevis 61 made with the ball joint 64 mounted at the end of rod 33 would cause rod 33 to rotate clockwise. Ball joint 64 at the end of rod 33 will now describe an arc with the center on a point on the first horizontal slider 31. Compliant lever 34 will not only cause rod 33 to rotate clockwise but will also subject it to a push force to the left which in turn will subject the first horizontal slider 31 to a push force to the left. The first horizontal slider 31 however cannot travel to the left due to the contact with fixed horizontal stop member 25. Rod 33, which is now rotating around a fixed point of stationary first horizontal slider 31 will instead cause a push force to the compliant lever 34 through pin 63 at three-element connection, forcing compliant lever 34 to compress. Consequently, centrally located point 70 on actuator arm 32 will drop on an arc trajectory described by ball joint 64 at the end of rod 33 causing actuator arm 32 to rotate counterclockwise around a point on horizontal slider 53, which will start to slide gently to the right at the same time along horizontal guide rail 21. It is the counterclockwise rotation of actuator arm 32 that causes the descent of the vertical guide rail 17 through the rotatable connection described in above and it is the first horizontal stop member 25 keeping the first horizontal slider 31 stationary that insures descent of vertical guide rail 17 and grabber tool 16 in straight vertical line. FIG. 9B shows an enlarged maximum length compliant lever callout 84 from FIG. 9A where at this point, the compliant lever 34 is positively in maximum length state and will start to compress.

FIG. 10A shows the configuration of the preferred embodiment of my pick and place device as the rotary shaft 44 continues rotating in a counterclockwise direction, the first horizontal slider 31 still abuts second first horizontal stop member 25 and the grabber tool 16 continues vertically downward by location F. Compliant lever 34, now compressed a predetermined amount continues to force the first horizontal slider 31 to remain stationary and abutted against horizontal stop member 25. More specifically, rod 33 continues to rotate around the fixed point of stationary first horizontal slider 31 and will continue to cause a push force to the compliant lever 34 through pin 63 at three-element connection, forcing compliant lever 34 to become compressed a predetermined amount. Consequently, centrally located point 70 on actuator arm 32 (due to the three-element connection) will continue on the arc trajectory described by ball joint 64 at the end of rod 33 causing actuator arm 32 to rotate counterclockwise around a point on horizontal slider 53, which now stopped sliding to the right and will start sliding gently to the left along horizontal guide rail 21. It is the counterclockwise rotation of actuator arm 32 that causes the descent of the vertical guide rail 17 through the rotatable connection described above and it is the first horizontal stop member 25 keeping the first horizontal slider 31 stationary that insures descent of vertical guide rail 17 and grabber tool 16 in straight vertical line. FIG. 10B show an enlarged view of the starting decompressing compliant lever call out 85 from FIG. 10A where the compliant lever 34 has compressed a predetermined amount and will start to decompress.

Figure 11B:
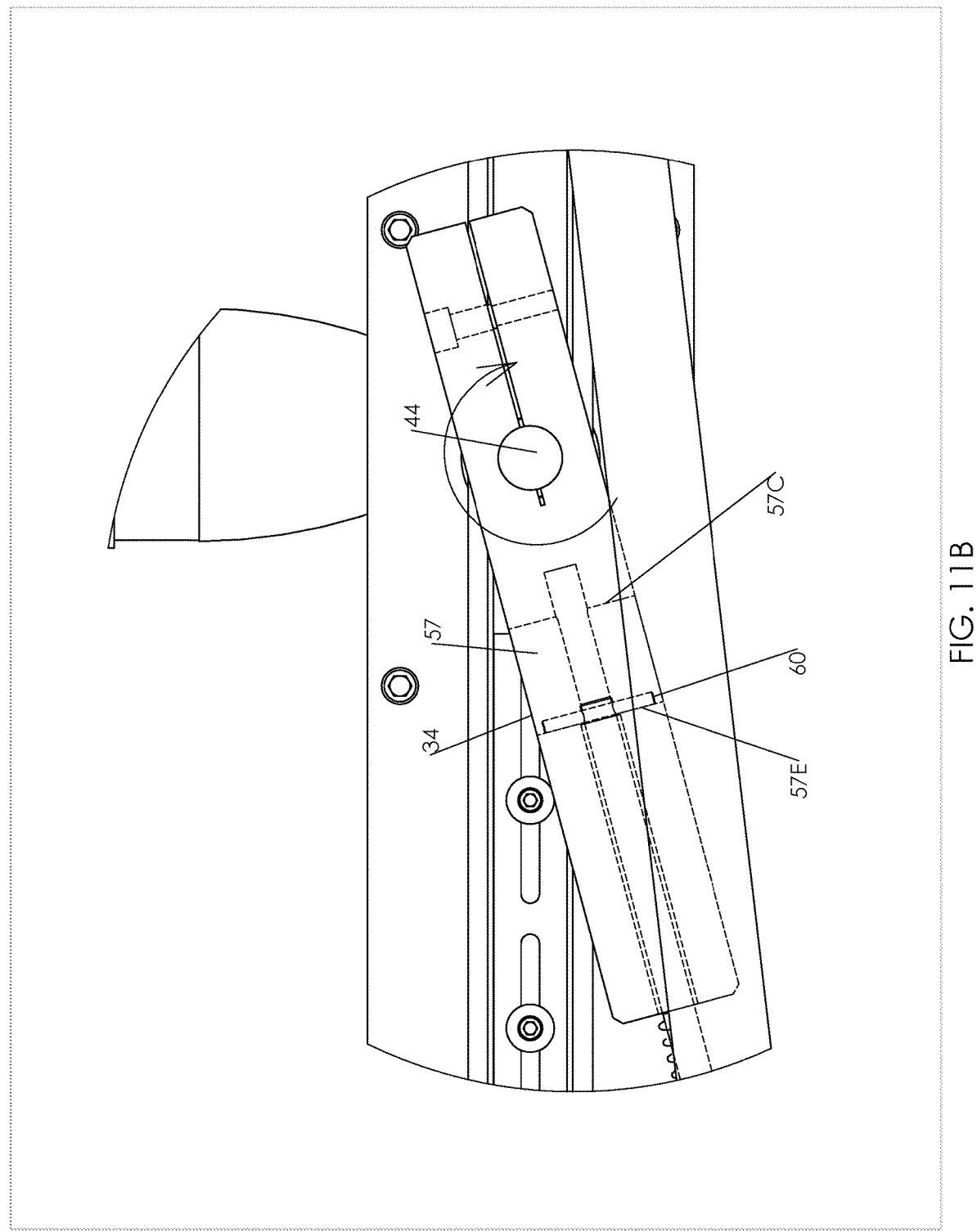
FIG. 11B is an enlarged detailed view of the components within the circled section 86 in FIG. 11A.

As shown in FIG. 11A, the grabber tool 16 and vertical rod 33 has reached its lowest descending point G and releases the object that had been picked up and moved. At this point the first horizontal slider 31 is still in contact with the first horizontal stop member 25 and the compliant lever 34 is shown extended back to its maximum length state. At this point an angle "d" between compliant lever 34 and horizontal guide rail 21 is formed below horizontal guide rail 21. In general, the motion of the grabber tool 16 has completed an inverted "U" motion starting at location A, and going through locations B, C, D, E, F and ending in location G. The sequence then continues in reverse order back to location A shown in FIG. 5A where a new item is picked up and the process continues. FIG. 11B shows an enlarged view of the reverse motion ready compliant lever callout 86 from FIG. 11A where at this point, the compliant lever 34 is shown in maximum length state and the payload then begins the reverse motion and ascends.

FIG. 5A to FIG. 11A show a case where the pick and place device is set up so the point A where the grabber tool 16 picks up the payload is at the same height with point G where the grabber tool 16 drops it off. Furthermore, compliant lever 34 is in maximum length state at both those positions in the presented case. At location C, where the first horizontal slider 31 just separates from second horizontal stop member 26 and at location E, where the first horizontal slider 31 just contacts horizontal stop member 25, the compliant lever 34 will always be in maximum length state.

Therefore, in the presented case all four angles "a", "b", "c" and "d" between compliant lever 34 and horizontal guide rail 21 corresponding to positions A, C, E and G respectively are equal in value. Of course, it is recognized that the final location of the grabber tool 16 can be set at any height, such as at any location between A and C for "pick-up" or any location between E and G for "drop-off". In those particular cases the pick-up and drop-off positions may find compliant lever 34 in a rather compressed state than maximum length state in which case angle "a" would be less than angle "b" and angle "d" would be less than angle "c" in value. The device can be set-up so angles "a", "b", "c" and "d" at points A, C, E, and G can have different values as long as they are within a range from 0 to 23 deg., fact that increases capability, flexibility and versatility of the pick and place device.

In controlling the pick and place device motions, setting parameters with the servomotor drive will determine how far the compliant lever 34 will swing to the left and right, and how long the grabber tool 16 will dwell in its initial and final positions, A and G, respectively. Pick-up and drop-off points A and G, furthermore, correspond to a certain value of the angle "a" and "d" referenced above. Angles "a" and "d", which is a function of how much compliant lever 34 swings to right and left, along with the duration of the dwell, the location of horizontal stop members 25 and 26, angular acceleration of output shaft 43 during the cycle are all variables that can be set to achieve different motion requirements. A device set-up with a lower magnitude of angles "b" and "c", (e.g., 0 to 15 degrees) will offer in general a longer horizontal travel and shorter straight-line vertical travel of grabber tool 16, and as a consequence during the straight vertical travel (A to C) and (E to G) compliant lever 34 will likely be subjected to a low level of total compression. A device set-up with higher angle "b" and "c" (e.g., 15 to 23 degrees), on the other hand, will offer in general longer straight vertical travel with somewhat shorter horizontal travel, and consequently during the straight vertical travel (A to C) and (E to G) compliant lever 34 will likely be subjected to a higher level of total compression. As can be seen, even by keeping the length of all linkage levers constant, just modifying a few parameters will still provide a high degree of flexibility in obtaining differing end results. Modifying the length of any of the linkage lever lengths will provide even more differing results with respect to payload trajectory to meet the requirements of specific applications. If a particular application requires picking and placing heavy payloads and/or the cycle rates that the pick and place device functions under are particularly high, there are a few things to be considered. If the application allows the pick-up point A to be coincident with point B or near it and if the drop-off point G can be coincident with point F or near it, an ideal condition is created in the system where the inertia forces in the linkage are very low, the amount of torque required from the servo-motor and gearbox is greatly reduced and the capability of the device in terms of payload and cycle rate is improved considerably. Limiting angle "a" and particularly the angle "d" to values from 0 to 15 deg. made by the spring-loaded compliant lever 34 below the horizontal rail 21 is recommended whenever possible. In designing the device and setting it up for a particular application extra care should be exercised around points C and E of the general trajectory when the path geometry transitions from the arc segment to a straight vertical line segment or vice versa. Angle made between the two theoretical speed vectors when the grabber tool 16 travels by those points, one vector corresponding to the arc segment and the other to the straight line segment of the general trajectory should be as low in value as possible when the device works in high cycle rates and/or heavy payloads mode in order to keep inertia forces in the linkage low and never more than 9 deg. Servo-motor 35 output shaft 43 angular speed when grabber tool 16 travels around those points can be programmed to drop down in order to maintain a smooth overall movement of the payload especially when running in those extreme working conditions. Servo-motor 35 output shaft 43 angular speed can be programmed so that the grabber tool 16 executes the straight line path after dwell between pick-up point A and transitional point C with low ramped up speed from point A, then ramped down speed before reaching point C. After passing point C, grabber tool 16 speed should be ramped up to a maximum speed around point D and then ramped down again before reaching point E. After going past point E the grabber tool 16 can follow the straight line path from E to G with ramped up low speed then ramped down to 0 by the time it reaches point G for payload drop off during dwell and so on. This contributes to a smooth overall movement of the grabber tool 16 and its payload during the cycle. A measure that can be also taken to improve the force balance in the linkage under high mass payload and high cycle rates is the use of counterweights. Linkage and overall performance can benefit from having counterweights added to the spring-loaded compliant lever 34 at its free end, opposite from the spring 48 and clevis 61. If the long actuator arm 32 is designed so that its length gets extending beyond its swivel point on horizontal slider 53, a counterweight can be added to that end as to improve dynamically the performance of the device under those extreme conditions.

While the preferred embodiments of the present invention have been illustrated in detail, it should be apparent that modifications and adaptations to those embodiments may occur to one skilled in the art without departing from the scope of the present invention.

I claim:

1. A pick and place device for the picking up and placing of objects from one location to another under a horizontal guide rail, said pick and place device comprising:
    a horizontal guide rail having a first end and a second end;
    means for supporting said horizontal guide rail to be above an object to be picked up and placed;
    a first horizontal slider configured to slide along said horizontal guide rail between said first end and said second end;
    a vertical guide rail, having a top end and a bottom end, said vertical guide rail secured to a vertical slider and configured to slide along said vertical slider;
    said vertical slider attached to said first horizontal slider such that one and only one source of torque moves both said vertical slide rail and said horizontal slider;
    the bottom end of said vertical guide rail configured to enable attachment to a grabber tool;
    whereby the vertical movement of said vertical guide rail and the horizontal movement of said horizontal slider allows a two-dimensional range of motion of the bottom end of said vertical guide rail to cover any location under said horizontal guild rail where an object can be picked up and can be placed.

2. The pick and place device of claim 1, further comprising means for moving said vertical slider and said horizontal slider using one and only one motor.

3. A pick and place device for the picking up and placing of objects from one location to another under a horizontal guide rail, said pick and place device comprising:
    a horizontal guide rail having a first end and a second end;
    means for supporting said horizontal guide rail to be above an object to be picked up and placed;
    a first horizontal slider configured to slide along said horizontal guide rail between said first end and said second end;
    a vertical guide rail, having a top end and a bottom end, said vertical guide rail secured to a vertical slider and configured to slide along said vertical slider;
    said vertical slider attached to said first horizontal slider;
    the bottom end of said vertical guide rail configured to enable attachment to a grabber tool;
    whereby the vertical movement of said vertical guide rail and the horizontal movement of said horizontal slider allows a two-dimensional range of motion of the bottom end of said vertical guide rail to cover any location under said horizontal guild rail where an object can be picked up and can be placed;

an actuator arm having a first end, a second end and a middle portion;

the first end of said actuator arm rotatably engaged with said vertical guide rail;

a second horizontal slider configured to slide along said horizontal guide rail between one end of said horizontal guide rail and said first horizontal slider;

the second end of said actuator arm rotatably attached to said second horizontal slider; a rod having a first end and a second end;

the first end of said rod rotatably attached to said first horizontal slider;

the second end of said rod rotatably attached to the middle portion of said actuator arm;

a compliant lever, having a first end and a second end;

the first end of said compliant lever rotatably connected to the second end of said rod and the middle portion of said actuator arm;

whereby rotation of said compliant lever can control the two-dimensional motion of the bottom end of said vertical guide rail.

4. The pick and place device of claim 3 further comprising a first horizontal stop member attached at a first selectable location to said horizontal guide rail preventing said first horizontal slider from traveling past said first selectable location toward said first end of said horizontal guide rail; and a second horizontal stop member attached at a second selectable location to said guide rail preventing said first horizontal slider from traveling past said second selectable location toward said second end of said horizontal guide rail.

5. The pick and place device of claim 4 further comprising means for extending and compressing the length of said compliant lever.

6. The pick and place device of claim 5 further comprising:

a motor;

a rotary shaft having a free end and a driven end, said driven end attached to and driven by said motor; and the free end of said rotary shaft secured to said compliant lever to control the rotation of said compliant lever.

7. A pick and place device for the picking up and placing of objects from one location to another under a horizontal guide rail, said pick and place device comprising:

a horizontal guide rail having a first end and a second end;

means for supporting said horizontal guide rail to be above an object to be picked up and placed;

a first horizontal slider configured to slide along said horizontal guide rail between said first end and said second end;

a vertical guide rail, having a top end and a bottom end, said vertical guide rail secured to a vertical slider and configured to slide along said vertical slider;

said vertical slider attached to said first horizontal slider;

the bottom end of said vertical guide rail configured to enable attachment to a grabber tool;

whereby the vertical movement of said vertical guide rail and the horizontal movement of said horizontal slider allows a two-dimensional range of motion of the bottom end of said vertical guide rail to cover any location under said horizontal guild rail where an object can be picked up and can be placed;

an actuator arm having a first end, a second end and a middle portion;

the first end of said actuator arm rotatably engaged with said vertical guide rail;

a second horizontal slider configured to slide along said horizontal guide rail between one end of said horizontal guide rail and said first horizontal slider;

the second end of said actuator arm rotatably attached to said second horizontal slider;

a rod having a first end and a second end;

the first end of said rod rotatably attached to said first horizontal slider;

the second end of said rod rotatably attached to the middle portion of said actuator arm;

a compliant lever, having a first end and a second end;

the first end of said compliant lever rotatably connected to the second end of said rod and the middle portion of said actuator arm;

whereby rotation of said compliant lever can control the two-dimensional motion of the bottom end of said vertical guide rail;

one and only one motor;

a rotary shaft having a free end and a driven end, said driven end attached to and driven by said motor; and the free end of said rotary shaft secured to said compliant lever between said first end and said second end of said compliant lever.

8. The pick and place device of claim 7 further comprising means for extending the length of said compliant lever between said first and second ends of said compliant lever.

* * * * *